US009433197B2

(12) United States Patent
Hyun

(10) Patent No.: US 9,433,197 B2
(45) Date of Patent: Sep. 6, 2016

(54) FISHING REEL HAVING CENTRIFUGAL BRAKE SYSTEM

(71) Applicant: DOYO ENGINEERING CO., LTD., Bucheon (KR)

(72) Inventor: Kwang-Ho Hyun, Bucheon (KR)

(73) Assignee: DOYO ENGINEERING CO., LTD. (KR)

( * ) Notice: Subject to any disclaimer, the term of this patent is extended or adjusted under 35 U.S.C. 154(b) by 129 days.

(21) Appl. No.: 14/325,661

(22) Filed: Jul. 8, 2014

(65) Prior Publication Data

US 2015/0014460 A1 Jan. 15, 2015

(30) Foreign Application Priority Data

Jul. 9, 2013 (KR) ........................ 10-2013-0080482

(51) Int. Cl.
*A01K 89/01* (2006.01)
*A01K 89/0155* (2006.01)

(52) U.S. Cl.
CPC ..... *A01K 89/01555* (2013.01); *A01K 89/0155* (2013.01)

(58) Field of Classification Search
CPC ........... A01K 89/015; A01K 89/0155; A01K 89/01557; A01K 89/0182; A01K 89/058
See application file for complete search history.

(56) References Cited

U.S. PATENT DOCUMENTS 4,390,140 A * 6/1983 Karlsson ............ A01K 89/0155 188/185
5,308,021 A * 5/1994 Ikuta .................. A01K 89/0155 242/289
5,393,005 A * 2/1995 Nakajima ............ A01K 89/033 188/184
5,803,385 A * 9/1998 Baisch ............... A01K 89/0155 188/185
5,865,387 A * 2/1999 Hirano ............... A01K 89/0155 188/181 A
5,996,921 A * 12/1999 Hogaki .............. A01K 89/0155 182/239
6,126,105 A * 10/2000 Yamaguchi ........ A01K 89/0155 188/164
6,254,021 B1 * 7/2001 Morimoto .......... A01K 89/0155 188/181 A
2004/0050990 A1 * 3/2004 Seo .................... A01K 89/0155 242/289
2009/0277985 A1 * 11/2009 Hyun ................ A01K 89/0155 242/286
2010/0001112 A1 * 1/2010 Noh ................... A01K 89/0155 242/289
2011/0073697 A1 * 3/2011 Koh ................... A01K 89/0155 242/288
2013/0181081 A1 * 7/2013 Niitsuma ........... A01K 89/0155 242/289

FOREIGN PATENT DOCUMENTS

KR 200345065 3/2004
KR 200345066 3/2004

* cited by examiner

*Primary Examiner* — Emmanuel M Marcelo
(74) *Attorney, Agent, or Firm* — Cantor Colburn LLP

(57) ABSTRACT

Disclosed herein is a fishing reel having a centrifugal brake system. The fishing reel includes a frame, a shaft, a spool and a centrifugal brake system. The centrifugal brake system includes a support member, a plurality of brake shoes, a brake disc, a controller and a connection member. The support member is provided on one side of the spool and is rotated in conjunction with the spool. The brake shoes are radially coupled to the support member by respective shaft pins. Each brake shoe has a heavy weight part and a light weight part on opposite sides based on the shaft pin to have a weight eccentric structure. The controller adjusts a distance between the brake disc and the brake shoes, thus controlling braking power. The connection member is coupled to the support member and includes protruding stoppers which limits swing displacement angles of the respective brake shoes.

6 Claims, 28 Drawing Sheets

[ BRAKE SHOE "A" Contact ]

[ BRAKE SHOE "B" Contact ]

[ BRAKE SHOE "C" Contact ]

[ BRAKE SHOE "D" Contact ]

[ BRAKE SHOE "E" Contact ]

[ BRAKE SHOE "F" Contact ]

FISHING REEL HAVING CENTRIFUGAL BRAKE SYSTEM

BACKGROUND OF THE INVENTION

1. Field of the Invention

The present invention relates generally to fishing reels having centrifugal brake systems for preventing backlash of spools of the fishing reels and, more particularly, to a fishing reel having a centrifugal brake system which includes a plurality of brake shoes, each of which has a weight eccentric structure having a heavy weight part and a light weight part provided at opposite sides based on a shaft pin around which the brake shoe is swung by centrifugal force, wherein the brake shoes make close contact with a brake pad of a brake disc, thus generating braking power, and the brake disc can be moved so that the braking power can be precisely controlled, and particularly, because the brake disc can be moved forwards or backwards by rotating a dial of the controller which is provided on an outer surface of the fishing reel, precision in adjustment of the braking power is markedly enhanced.

Moreover, the present invention provides a fishing reel having a centrifugal brake system which includes protruding stoppers for limiting swing displacement angles of the brake shoes and is configured such that a position at which each brake shoe begins to make contact with a brake disc is disposed above the shaft pin, whereby the brake shoes can be reliably and smoothly operated, thus making the braking system precise.

2. Description of the Related Art

When casting for fishing using a fishing reel or a bait reel, even after a fish hook with bait has been cast, a spool around which a fishing line is wound may still be rotated by centrifugal force, thus causing a backlash event in which the fishing line is overlapped and entangled.

To prevent a backlash problem, first, there is a method using centrifugal force such that a brake shoe makes contact with a brake pad and brakes the spool.

Second, a method using magnetic force to brake the spool may be used.

A representative example of the former was proposed in Korean Utility Model Registration No. 20-0345065 (Mar. 4, 2004), which was filed by the applicant of the present invention, entitled [Device for preventing backlash of spool of bait reel for fishing]. This conventional technique is configured such that the number of brake shoes that can be operated is easily adjusted, whereby the rotation of the spool can be smoothly braked, thus making it possible to control backlash.

A representative example of the latter was proposed in Korean Utility Model Registration No. 20-0345066 (Mar. 4, 2004), which was also filed by the applicant of the present invention, entitled [Spool cover assembly for preventing backlash of spool of bait reel for fishing]. In this technique, a body of a spool cover is an upper end open type, rather than a vertically through body type, so that assembly of elements can be conducted through the open upper end. This technique is also characterized in that the number of permanent magnets can be approximately doubled compared to that of the existing technique.

Typically, as introduced in the former, an anti-backlash brake system using brake shoes is advantageous in that only when the spool is rotated can the braking power be generated, but has a disadvantage of requiring the side cover to be opened in order to control the braking power.

Furthermore, there is a problem in that: because the brake shoes are imprecisely operated, it is difficult to provide precise braking force.

Furthermore, as proposed in the latter, an anti-backlash brake system using magnetic force has an advantage in that the braking power can be controlled by rotating a dial and moving the magnets forwards or backwards without opening the side cover but is disadvantageous in that the braking force always acts.

Given this, a brake system, which can strengthen the advantages and make up for the disadvantages of both methods is required, in other words, is configured such that the braking power can be controlled without opening the side cover, and the On/Off state of the braking power can be selected by a simple manipulation so that conditions in which the braking power is 0 (zero), essential for a noise test or a reel performance test, can be easily embodied.

SUMMARY OF THE INVENTION

Accordingly, the present invention has been made keeping in mind the above problems occurring in the prior art, and an object of the present invention is to provide a fishing reel having a centrifugal brake system which has advantages of both a brake shoe type and a magnetic type so that braking power can be controlled without opening a side cover, and the On/Off state of the braking power can be selectively determined, whereby conditions in which the braking power is 0 (zero), essential for a noise test or a reel performance test, can be easily embodied.

Another object of the present invention is to provide a fishing reel having the centrifugal brake system which includes a plurality of brake shoes, each of which has a weight eccentric structure having a heavy weight part and a light weight part provided at opposite sides based on a shaft pin, and in which the braking force can be easily controlled in such a way that a brake disc is moved by manipulating a controller at the outside of the side cover.

A further object of the present invention is to provide a fishing reel having the centrifugal brake system which further includes protruding stoppers that limit extents of swing displacement of the brake shoes when the spool is rotated, wherein the swing displacement limit points of the protruding stoppers are different from each other, thus making it possible to finely control the centrifugal braking power despite having a simple structure.

Yet another object of the present invention is to provide a fishing reel having the centrifugal brake system in which the brake disc can be moved away from or towards the brake shoes merely by rotating a dial of the controller coupled to the side cover.

Still another object of the present invention is to provide a fishing reel having the centrifugal brake system which further includes a guide means for making movement of the brake disc forwards or backwards to control the braking power smoothly.

Still another object of the present invention is to provide a fishing reel having the centrifugal brake system in which the swing displacement angle of each brake shoe is limited to a predetermined degree so that a position at which the brake shoe makes contact with the brake disc is formed on the same level as that of the outer surface of the support to which the brake shoes are coupled, whereby the brake shoes can be reliably operated, and a user can precisely control the braking force to a desired degree.

Still another object of the present invention is to provide a fishing reel having the centrifugal brake system which is configured such that a position at which each brake shoe first begins to make contact with the brake disc is disposed above the shaft pin, so that the swing displacement range of the brake shoe can be reduced, whereby the braking force generated by friction of the brake shoes can be reliably and uniformly applied.

In order to accomplish the above object, the present invention provides a fishing reel, including: a frame; a shaft coupled to the frame; a spool provided on the shaft to allow a fishing line to be wound around the spool; and a centrifugal brake system. The centrifugal brake system includes: a support member provided on one side of the spool, the support member being rotated in conjunction with the spool; a plurality of brake shoes radially coupled to the support member by respective shaft pins, each of the brake shoes having a heavy weight part and a light weight part on opposite sides based on the corresponding shaft pin to have a weight eccentric structure, wherein when the spool is rotated, the brake shoes are swung by centrifugal force; a brake disc coupled to the frame; a controller adjusting a distance between the brake disc and the brake shoes, thus controlling braking power; and a connection member coupled to the support member, the connection member comprising a plurality of protruding stoppers limiting swing displacement angles of the respective brake shoes.

The connection member may have a plurality of slots in which the respective brake shoes are swung, and each of the protruding stoppers may be provided on opposite sides of the corresponding slot and protrudes in a direction opposite to a direction in which the corresponding brake shoe is swung.

The protruding stoppers may have different heights so that limit points of the swing displacement angles of the brake shoes differ from each other.

A friction position area between the brake disc and each of the brake shoes under control of the controller may be formed on the same horizontal line as an outer side surface of the support member based on a circumferential direction of the support member.

A friction start position between the brake disc and the brake shoe under control of the controller may be spaced apart from a center of the shaft pin towards the spool by a predetermined distance based on a circumferential direction of the support member.

The brake disc may include: an auxiliary disc having a depression in a central portion thereof so that a portion of the support member is coupled to the auxiliary disc through the depression in an embedded form, with a protrusion protruding from a peripheral outer surface of the depression towards the spool; and a brake pad coupled to the protrusion of the auxiliary disc, the brake pad making contact with friction parts of the brake shoes, thus providing braking force.

Each of the brake shoes may be configured such that, when the brake shoe has been completely swung, the friction part is disposed at a position spaced apart from the shaft pin of the brake shoe towards the spool.

A side cover may be mounted to the frame, and the controller may include a dial coupled to the side cover.

A fishing reel having a centrifugal brake system according to the present invention has advantages of both a brake shoe type and a magnetic type so that braking power can be controlled without opening a side cover, and the On/Off state of the braking power can be selectively determined, whereby conditions in which the braking power is 0 (zero), essential for a noise test or a reel performance test, can be easily embodied. Furthermore, the present invention uses a plurality of brake shoes, each of which has a weight eccentric structure having a heavy weight part and a light weight part provided at opposite sides based on a shaft pin. The braking force can be easily controlled in such a way that a brake disc is moved by manipulating a controller at the outside of the side cover. In addition, the present invention further includes stoppers which limit extents of swing displacement of the brake shoes when the spool is rotated. The swing displacement limit points of the stoppers are different from each other, thus making it possible to finely control the centrifugal braking power despite using a simple structure. Moreover, the brake disc can be moved away from or towards the brake shoes merely by rotating a dial of the controller coupled to the side cover. Further, the operation of moving the brake disc forwards or backwards to control the braking power is smoothly conducted by a guide means.

Furthermore, in the fishing reel having the centrifugal brake system according to the present invention, the swing displacement angles of the brake shoes are limited using protruding stoppers. A position at which the friction part of each brake shoe makes contact with the brake disc is formed above the shaft pin towards the spool. Thus, the swing displacement range of the brake shoe is minimized, whereby the fishing reel can be more reliably operated. As a result, the user can more precisely and accurately control the braking force while fishing.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1A:
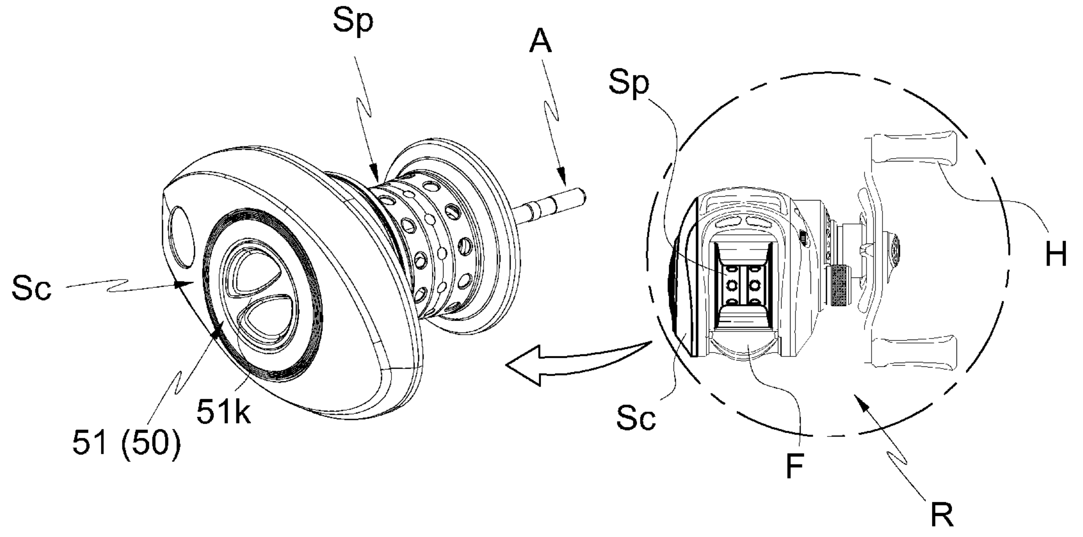
FIGS. 1A and 1B are respectively a perspective view and a sectional view illustrating a fishing reel having a precise centrifugal brake system according to the present invention.

Hereinafter, a preferred embodiment of the present invention will be described in detail with reference to the attached drawings.

The present invention may, however, be embodied in many different forms and should not be construed as being limited to only the embodiments set forth herein, but should be construed as covering modifications, equivalents or alternatives falling within ideas and technical scopes of the present invention.

In the figures, like reference numerals, particularly, tens and units, or reference numerals having like tens, units and letters refer to like elements having like functions throughout, and unless the context clearly indicates otherwise, elements referred to by reference numerals of the drawings should be understood based on this standard.

Also, for convenience of understanding of the elements, in the figures, sizes or thicknesses may be exaggerated to be large (or thick), may be expressed to be small (or thin) or may be simplified for clarity of illustration, but due to this, the protective scope of the present invention should not be interpreted narrowly.

The terminology used herein is for the purpose of describing particular aspects (or embodiments) only and is not intended to be limiting of the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

Figure 3:
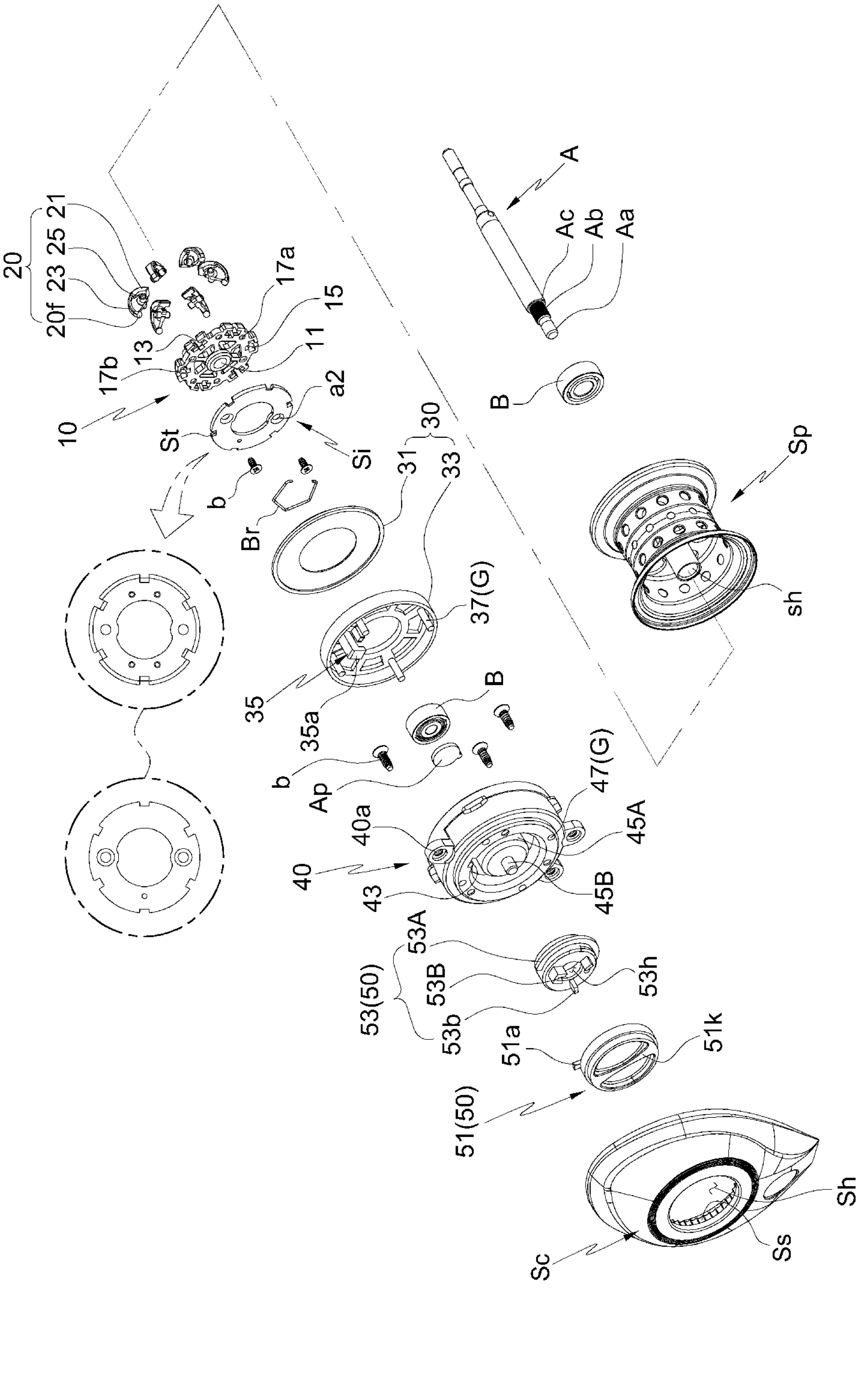
FIGS. 3 and 4 are exploded perspective views showing, in different directions, a critical part of the fishing reel having the precise centrifugal brake system according to the present invention.

In the description of a fishing reel R having a precise centrifugal brake system according to the present invention, the orientation will be approximately defined with reference to FIGS. 1 and 3 for the sake of explanation.

Each drawing of FIGS. 1 and 3 is divided into upper, lower, left, right, front and rear portions, and a side adjacent to a side cover Sc is designated as a first side or outer side. Based on this, the criteria of orientation will be used in the explanation of the embodiment of the present invention that is associated with other drawings and in the accompanying claims.

Figure 1B:
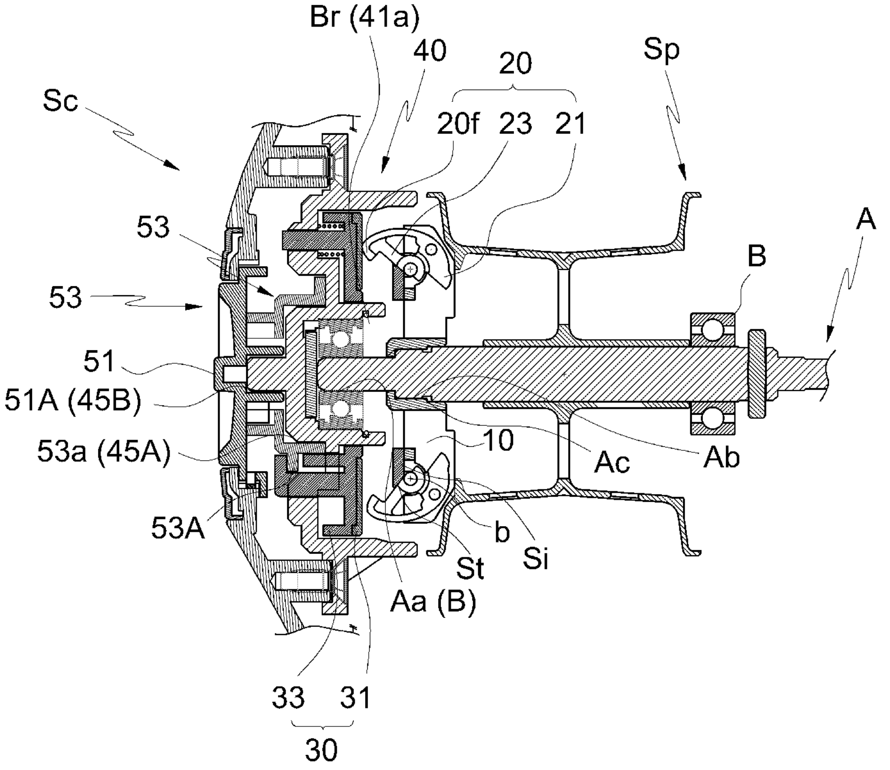

As shown in FIGS. 1A and 1B, the fishing reel R having the precise centrifugal brake system according to the present invention includes a frame F, a shaft A which is mounted to the frame F, a spool Sp which is provided around the shaft A and around which a fishing line is wound, a handle H which is used to rotate the spool Sp, and a side cover Sc which is coupled to the spool Sp to cover the elements of the fishing reel R.

As shown in FIGS. 1A through 4, the basis of a first embodiment of the fishing reel R according to the present invention is the centrifugal brake system which includes: brake shoes 20 which are swung when the spool is rotated; a brake disc 30 which makes contact with the brake shoes 20 when the spool is rotated; and a controller 50 which adjusts the distance between the brake disc 30 and the brake shoes 20 to precisely control the braking force.

The spool Sp has a drum shape, having a plurality of through holes in a circumferential outer surface thereof to reduce the weight thereof. Further, a shaft hole, into which the shaft A is inserted, is formed in the spool Sp. The shaft A is rotatably supported by two bearings B which are provided on opposite sides of the spool Sp.

The shaft A has, at a predetermined position, a support end Aa which is coupled to a left bearing B. A coupling part Ab and a stepped portion Ac are successively formed on the shaft A from the support end Aa towards the medial portion of the shaft A.

As shown in FIGS. 1A through 4, each of the brake shoes 20 which are radially arranged around the shaft A has a weight eccentric structure in which a heavy weight part 21 and a light weight part 23 are provided on opposite sides of a shaft pin 25. Particularly, the shaft pin 25 is oriented in a circumferential direction of the shaft A, rather than being oriented in a radial direction thereof, in such a way that an axis of the shaft pin 25 does not intersect with that of the shaft A.

When the shaft A is rotated by rotation of the spool Sp, a support member 10, in a circumferential outer portion of which the brake shoes 20 are arranged, is also rotated. Then, each brake shoe 20 is swung around the shaft pin 25 in such a way that the heavy weight part 21 is rotated around the shaft pin 25 away from the shaft A while the light weight part 23 is rotated around the shaft pin 25 towards the shaft A such that the light weight parts 23 of the brake shoes 20 gather towards the shaft A.

The support member 10 is disposed at the first side of the spool Sp and is forcibly fitted over the coupling part Ab of the shaft A (in a variety of coupling ways including threaded coupling, bonding, and so on). A position at which the support member 10 is positioned on the shaft A is determined by the stepped portion Ac.

The expression 'the coupling of the support member 10 to the shaft A' is a symbolic meaning and a faithful explanation based on the drawings. More essentially, it is a more exact expression of the support member being assembled with the shaft and interlocked to the spool to prevent backlash in such a way that the spool is braked by the centrifugal brake system that is the basis of the present invention.

The support member 10 has, in a central portion thereof, a through hole 11 which is fitted over the coupling part Ab of the shaft A. Furthermore, the support member 10 has shaft-pin-installation parts, to which the shaft pins 25 of the respective brake shoes 20 of the weight-eccentric structure are coupled so that the brake shoes 20 can be swung using centrifugal force. Particularly, each shaft-pin-installation part has a shaft pin depression 15. The support member has openings 13 which radially communicate with the respective shaft pin depressions 15 to provide space in which the brake shoes 20 can swing using centrifugal force around the shaft pins 25.

Preferably, each brake shoe 20 has a stopper to define a limit of the swing displacement.

When forward or backward movement of the brake disc 30 is controlled by the controller 50, the maximum of the distance between the brake disc 30 and each brake shoe 20 is defined by the stopper. When the distance between the brake disc 30 and each brake shoe 20 is greatest, the braking force becomes zero.

When the brake shoes 20 are swung to the maximum by the centrifugal force, in other words, when each brake shoe is swung by the rotation of the spool in such a way that the heavy weight part 21 of the brake shoe 20 is rotated away from the shaft A and the light weight part 23 is rotated towards the shaft A, a friction part 20*f* provided on an end of the light weight part 23 becomes parallel to the shaft A.

In this state, if the friction part 20*f* of the brake shoe 20 does not come into contact with the brake pad 31 of the brake disc 30, the braking force becomes zero. However, this structure may not be preferable, because it is against the trend to reduce the weight and size of the fishing reel R, given the fact that the fishing reel R has a compact assembly structure in which elements having various functions are integrated in a smaller space than an adult's fist.

In the embodiment illustrated in the drawings, the brake disc 30 is coupled to a mounting drum 40, and the mounting drum 40 is fastened to the side cover Sc.

In the specification (particularly, in the claims), the description that the brake disc is coupled to the frame is to comprehensively express critical common factors of embodiments and modifications based on the scope and spirit of the invention, in consideration of the fact that the mounting drum, the side cover and other elements are eventually mounted to the frame.

The function of the stopper may be embodied by the shape of the opening 13 of the support member 10.

However, the function of the support member which supports the shaft pin 25 of each brake shoe 20 and the function of the stopper may be separately provided.

The production process can be facilitated, and the product quality, such as durability, as well as the price competitiveness, can be enhanced by assigning required functions to different elements.

Moreover, the stoppers have different swing displacement limit points to precisely control braking force and are configured such that a variety of swing displacement combinations of the brake shoes depending on fishing conditions can be provided. To achieve the above purposes, in the present invention, a separate member, that is, a connection member Si which integrally has stoppers for the brake shoes 20, is used to conduct the function of stopping the brake shoes.

As shown in FIGS. 5A through 5D, the connection member Si includes protruding stoppers Sta which are provided on opposite sides of each slot, in which the corresponding brake shoe 20 is swung. In detail, the protruding stoppers Sta protrude in a direction opposite to the direction in which the brake shoe 20 is swung by centrifugal force. Furthermore, the protruding stopper Sta of each slot has a different height.

That is, when the spool rotates, the support member 10 is rotated in conjunction with the rotation of the spool, and each of the six brake shoes 20 is swung around the shaft pin 25 by centrifugal force. Then, the light weight part 23 is rotated towards the shaft A. The angle to which each brake shoe 20 can be swung is determined depending on a position at which the brake shoe 20 makes contact with the corresponding stoppers Sta.

In other words, if the protruding stopper Sta is comparatively high, the light weight part 23 of the corresponding brake shoe 20 early makes contact with the protruding stopper Sta and stops its rotation so that the brake shoe 20 can no longer conduct the braking function.

On the other hand, if the protruding stopper Sta is comparatively low or there is no protruding stopper Sta on the connection member Si, the light weight part 23 of the brake shoe 20 makes contact with the protruding stopper Sta (or the bottom of the connection member Si) later by a height difference of the high protruding stopper and the low protruding stopper such that the brake shoe 20 can conduct the braking function for longer.

Therefore, when the distance between the brake disc 30 and the brake shoes 20 or the support member 10 is reduced by the controller 50 and is thus comparatively short, friction parts 23*f* of all of the brake shoes 20 can be brought into contact with the brake disc.

However, When the distance between the brake disc 30 and the brake shoes 20 or the support member 10 is relatively large, the friction parts 23*f* of some of the brake shoes 20 can be brought into contact with the brake disc (in the case where the protruding stoppers Sta are comparatively low or there is no protruding stopper), while the friction parts 23*f* of the other brake shoes 20 cannot make contact with the brake disc (in the case of the protruding stoppers Sta having comparatively large heights).

Preferably, for balanced friction contact, the protruding stoppers Sta may be configured such that the protruding stoppers Sta that are disposed at diametrically opposite positions have the same height.

Alternatively, as needed, the protruding stoppers Sta may be configured such that all protruding stoppers Sta have different heights so as to make unbalanced friction contact possible.

In an embodiment, the protruding stoppers (Sta) may have different heights and be arranged successively depending on the heights.

The present invention is advantageous in that because a position at which each brake shoe 20 can make contact with the brake disc is limited by the corresponding protruding stopper Sta, a manufacturer can easily manufacture the centrifugal brake system in such a way that a difference of braking force can be digitized merely by adjusting the heights of the protruding stoppers.

That is, in manufacturing the fishing reel having the centrifugal brake system according to the present invention, digitizing a difference of braking force depending on a frictional contact position of the brake shoe is needed to provide precise braking force.

If the fishing reel is manufactured in such a way that an angle at which each brake shoe is swung is optionally limited, it is difficult to provide production standards, based on which a difference of braking force can be digitized.

Given this, in the present invention, a difference of braking force depending on a position at which each brake shoe makes contact with the brake disc can be easily digitized merely by measuring the height of the protruding stopper and thereafter measuring a corresponding braking force.

Therefore, to provide uniform braking force to all products, the manufacturer has only to manufacture the support member such that the protruding stoppers have different heights corresponding to the preset production standards obtained from the measurement result, without conducting a separate measurement process every when manufacturing the support member. As a result, the process of manufacturing the precise centrifugal braking system can be markedly facilitated, and the reliability of the product can be greatly enhanced.

The present invention may be designed such that, when the distance between the brake disc 30 and the brake shoes or the support member 10 is largest, the friction parts 20*f* of all of the brake shoes 20 do not come into contact with the brake pad 31 (even when the friction parts 20*f* are not parallel to the shaft), whereby the braking force of the centrifugal brake system can become zero.

Thereby, even in a noise test or a reel performance test which must be carried out when the braking force is 0 (zero), the off state of the braking force can be made merely by manipulating the controller 50 without removing the side cover.

Furthermore, in the case where the distance between the brake disc 30 and the brake shoes 20 or the support member 10 is smallest, even when the spool does not rotate, the friction parts 20*f* of the brake shoes 20 come into contact with the brake pad 31 so that the function of braking the rotation of the spool can be continuously conducted.

As such, the structure in which the swing displacement limit points of the stoppers differ from each other makes the production, control and design easier and is more effective in terms of precisely controlling the braking force, compared to the structure in which the brake shoes have different shapes of heavy weight parts and light weight parts.

As necessary, the heavy weight part and the light weight part of each brake shoe may be made of different materials, and the friction part 20*f* may be made of a material (superior in terms of wear resistance, rub resistance or both, for example, hard rubber or hard synthetic resin) different from that of other portions.

The present invention is configured such that a swing displacement of each brake shoe 20 is limited to a predetermined degree, whereby braking force using friction with the brake shoes 20 can be more reliably embodied.

The terms "limiting the swing displacement angle of the brake shoe 20" refers to limiting an angle to which the brake shoe 20 that has been in a noncontact state is swung to make contact with the brake disc 30. Thereby, each brake shoe 20 can be reliably swung within a predetermined range.

The present invention uses the protruding stoppers Sta to limit the swing displacement angles of the brake shoes 20 to different degrees and make the swing displacement angles different from each other.

Moreover, the present invention is configured such that the swing displacement angle of each brake shoe 20 that is limited by making contact with the corresponding protruding stopper Sta is relatively small (because the brake shoe 20 can no longer swing after making contact with the protruding stopper Sta). Therefore, precise braking force can be ensured by the reliable friction operation of the brake shoes 20.

The term "limiting the swing displacement angle of the brake shoe 20" may be more precisely expressed as follows.

As shown in FIGS. 7A through 7I, the term may be expressed as "limiting a position range D1 of friction between the brake shoe 20 and the brake disc 30 using a controller."

This refers to limiting the friction position area D1 from a friction position, at which the brake disc 30 starts friction with the brake shoe 20 at a location relatively far from the brake shoe 20 or the support member, to a friction position at which the brake disc 30 makes contact with the brake shoe 20 at a location relatively closest to the brake shoe 20 or the support member (that is, the point at which the brake disc 30 makes contact with all of the brake shoes 20 so that the maximum frictional force is generated; and the magnitude of the braking force will be accordingly explained in detail later herein).

Thereby, limiting the swing displacement angle of the brake shoe 20 can be embodied.

For this (in FIGS. 7A through 7I, for the sake of the explanation, although the operation of the brake shoe 20 that is disposed in the slot having no protruding stopper Sta will be explained as a representative example, limiting the swing displacement angle of each brake shoe 20 provides the same function and effect, but only the angle displacement range is changed depending on the height of the protruding stopper Sta), in the centrifugal braking system according to the present invention, the friction position area D1 between the brake disc 30 and the brake shoe 20 under control of the controller 50 is preferably formed on the same horizontal line as that of the outer side surface of the support member 10 based on the circumferential direction of the support member 10.

In detail, because the friction positions of the brake shoe 20 that are illustrated in FIGS. 7A through 7I are formed below the support member 10 based on FIGS. 7A through 7I, the angle to which the brake shoe 20 can be swung is increased. As a result, the distance that the light weight part 23 can be swung and moved is increased.

Due to this, if the centrifugal force of the support member 10 is not sufficient, centrifugal swing displacement of the heavy weight part 21 cannot be satisfactorily conducted. Hence, the light weight part 23 cannot be sufficiently rotated towards the shaft, whereby braking force resulting from friction with the brake disc 30 may not be generated.

Furthermore, as the swing displacement range of the brake shoe 20 is large, repulsive force which is generated when the brake shoe 20 makes contact with the brake disc 30 is increased. Thus, there is the possibility of the light weight part 23 of the brake shoe 20 being removed away from the brake disc 30.

This may impede the purpose of the present invention for precisely adjusting the braking force.

To avoid this problem, the present invention is configured such that the friction position area D1 of the brake shoes 20 and the brake disc 30 is disposed on the same horizontal line as that of the outer side surface of the support member 10 with respect to the horizontal direction based on FIG. 7.

Figure 7A:
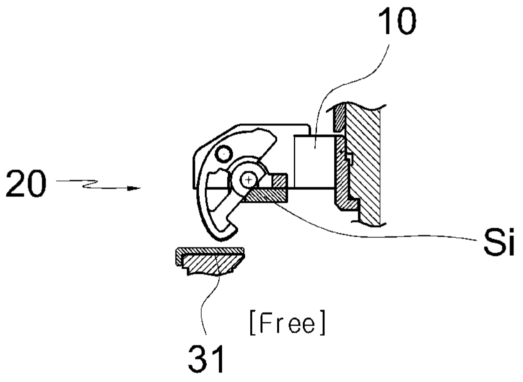
FIGS. 7A through 7I are views illustrating displacement in swing motion of the brake shoe according to the present invention.
Figure 7B:
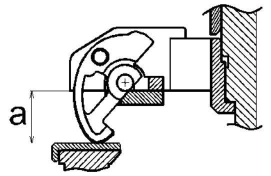
Figure 7C:
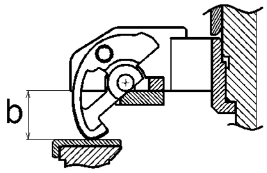
Figure 7D:
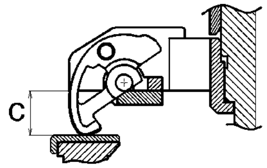
Figure 7E:
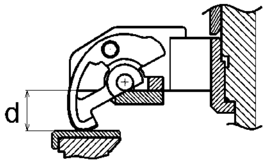
Figure 7F:
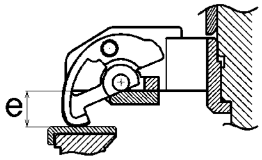
Figure 7G:
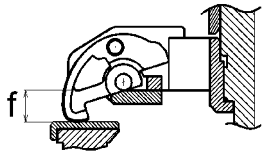
Figure 7H:
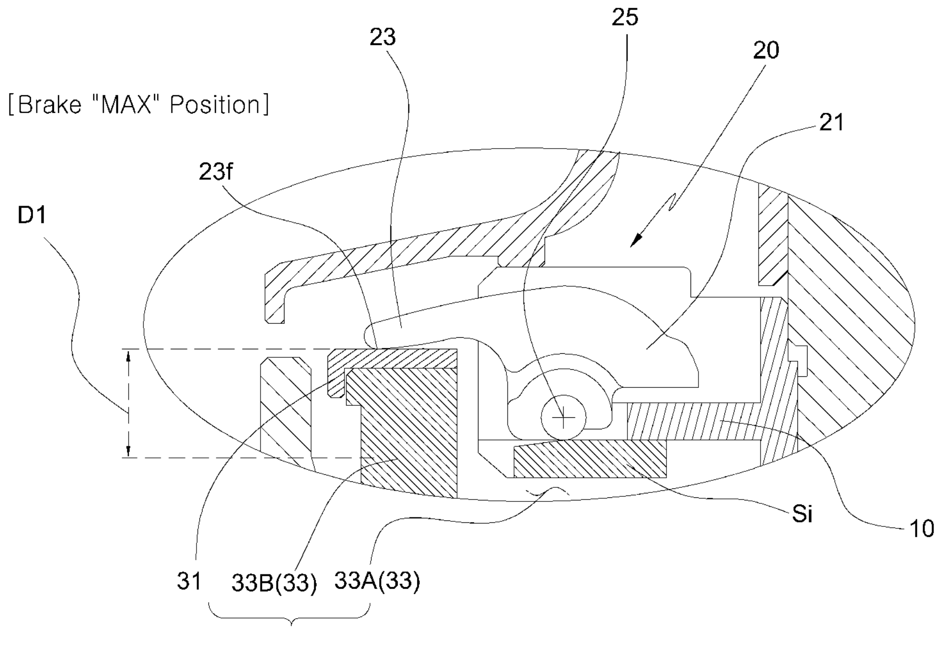
Figure 7I:
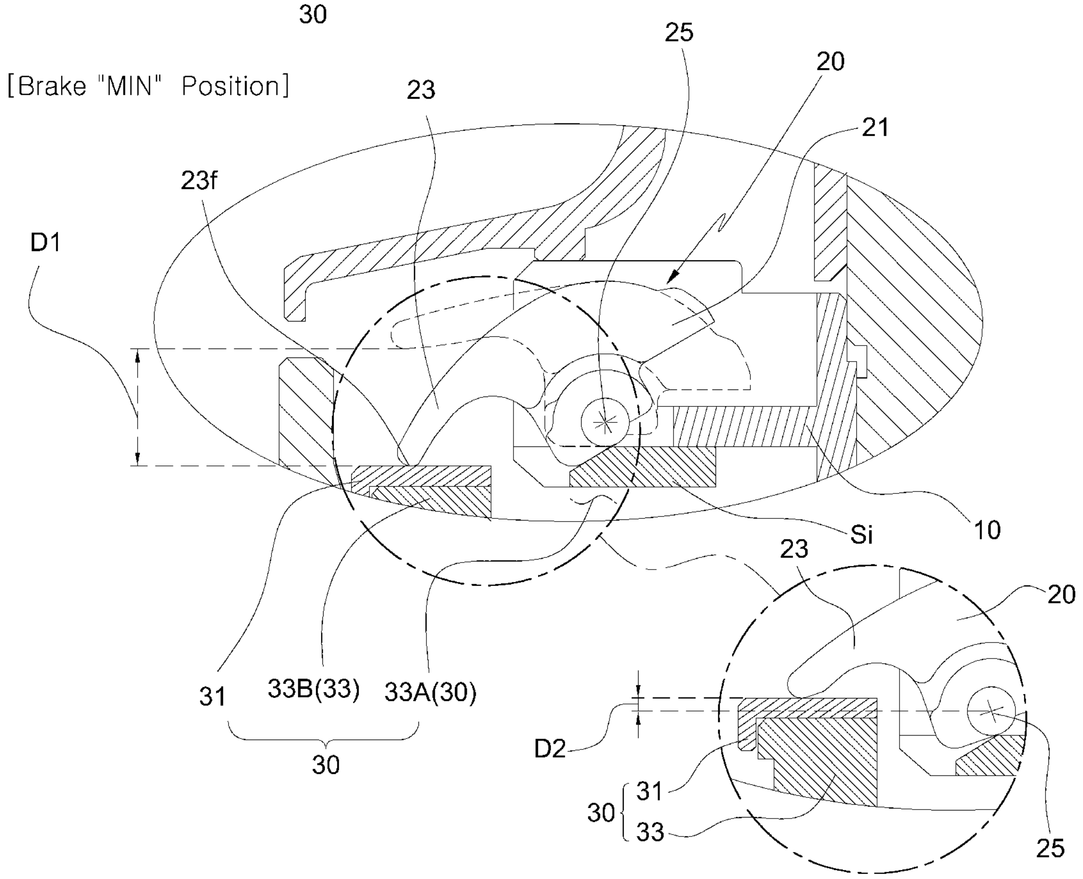

The term "disposing on the same horizontal line as that of the outer side surface of the support member 10 with respect to the horizontal direction" means that the position at which the brake shoe 20 makes contact with the brake disc (the brake pad 33) is disposed at the same height area (position) as that of the support member 10, as shown in FIGS. 7H and 7I, rather than being disposed below the bottom of the support member 10, as shown in FIGS. 7A through 7G.

For this, the brake disc 30 according to the present invention includes an auxiliary disc 33 and a brake pad 31. The auxiliary disc 33 has a depression 33A in a central portion thereof so that a portion of the support member 10 is coupled to the auxiliary disc 33 through the depression 33A in an embedded form. The auxiliary disc 33 includes a protrusion 33B which protrudes from a peripheral outer surface of the depression 33A towards the spool (Sp; refer to FIG. 1). The brake pad 31 is coupled to the protrusion 33B of the auxiliary disc 33 and makes contact with the friction parts 23*f* of the brake shoes 20 to provide braking force.

Therefore, because the present invention includes the support member 10 which is embedded in the auxiliary disc 33 and the brake pad 31 which is provided on the protrusion 33B around the support member 10 and makes contact with the brake shoes 20, the friction position area D1 (the distance that the brake disc 30 can be moved by the controller) of the maximum width has no choice but to be disposed on the same horizontal line as that of the outer side surface of the support member 10. Thus, regardless of the protruding stoppers Sta, the brake shoes 20 can ensure reliable friction, thus providing precise braking force.

Moreover, in the present invention, to make the operation of swinging the brake shoes 20 more reliable and thus control the braking force more precisely, as shown in FIG. 7I, the friction start position between the brake disc 30 and the brake shoe 20 under control of the controller 50 is spaced apart from the center of the shaft pin 25 towards the spool (Sp; refer to FIG. 1) by a predetermined distance D2 based on the circumferential direction of the support member 10.

In detail, the brake disc 30 is moved forwards and backwards by the controller 50.

As described above, when the distance between the brake disc 30 and the brake shoe 20 or the support member 10 is the largest, the friction parts 23*f* of all of the brake shoes 20 do not make contact with the brake pad 31 (even when the friction parts 23*f* are not parallel to the shaft) so that the braking force of the centrifugal braking system becomes zero.

Here, if each brake shoe 20 is configured such that the light weight part 23 thereof can be continuously rotated towards the shaft by the rotation of the support member 10, after all, the brake shoe 20 may make contact with the brake disc 30.

To prevent the above problem, if the distance that the brake disc 30 moves forwards and backwards is increased, this structure may not be preferable, because it is against the trend to reduce the weight and size of the fishing reel R and, as well, the production cost is increased.

Given this, the present invention is configured such that the position at which the light weight part 23, more particularly, the friction part 23*f*, of the brake shoe 20 makes contact with the brake disc when it is maximally swung is formed at a position spaced apart from the shaft pin 25 of the brake shoe 20 towards the spool (Sp; refer to FIG. 1) by a predetermined distance D2.

This configuration can prevent the above-mentioned problem and limit the swing displacement angle of the brake shoe 20, thus ensuring more reliable friction.

A variety of methods can be used to limit the maximum swing displacement position of the friction part 23*f*.

In a representative example of such methods, the friction part 23*f* of the brake shoe 20 is formed adjacent to the spool (Sp; refer to FIG. 1) more than the end of the heavy weight part 21, and the protruding stopper Sta is used to limit the swing displacement angle.

The expression "the friction part 23*f* is formed adjacent to the spool (Sp; refer to FIG. 1) more than the end of the heavy weight part 21" means that based on FIG. 7, the friction part 23*f* is disposed above the lower end of the heavy weight part 21.

In another embodiment of the method of limiting the maximum swing displacement position of the friction part 23*f*, a limit unit (refer to FIG. 17 and related explanation) which will be described later herein may be used such that the friction part 23*f* can be prevented from being swung to a position below the shaft pin 25.

Hereinafter, several modifications of the brake shoe will be described with reference to FIGS. 12A through 12E.

Figure 12A:
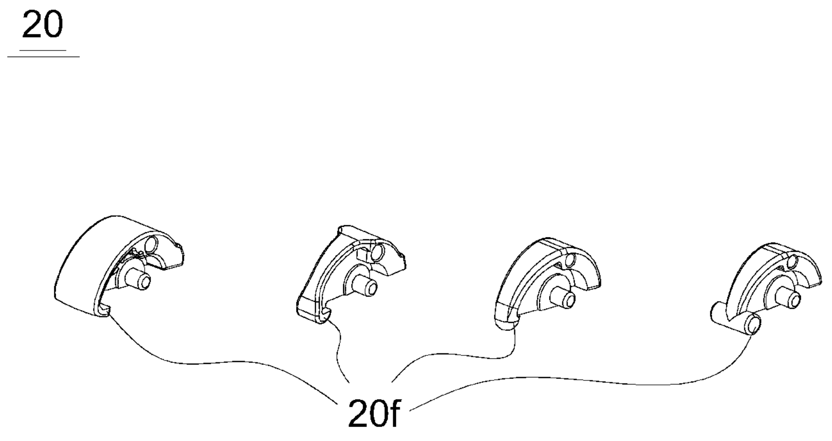
FIGS. 12A through 12E are perspective views showing several modifications of the brake shoe according to the present invention.

As shown in FIG. 12A, the brake shoe 20 may have a single integrated body. The body of the brake shoe 20 can be modified into a variety of shapes, including a basic type in which the heavy weight part, the light weight part and the friction part have the same width, a cut type in which a portion other than the heavy weight part is cut to form the light weight part, and a wedge type in which the width is gradually reduced from the heavy weight part to the friction part.

Figure 12B:
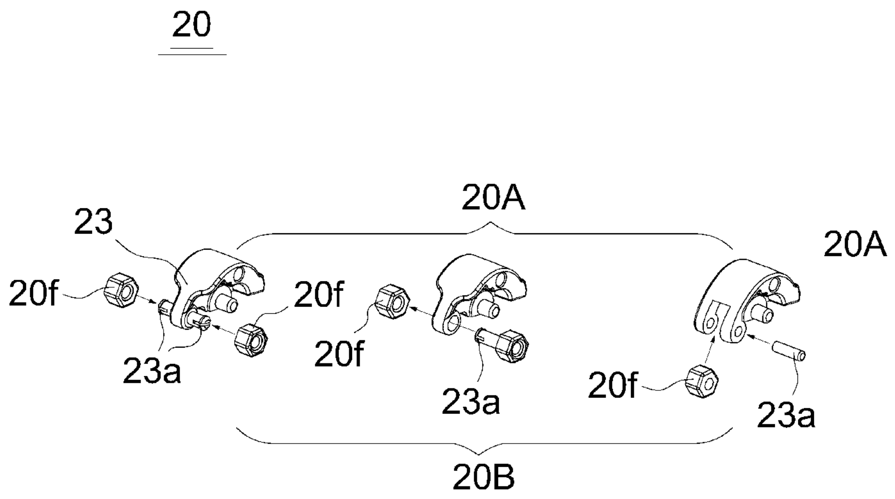

As shown in FIG. 12B, the brake shoe 20 may have a two-piece structure including a main body 20A and a separate friction part body 20B. The main body 20A has a shaft installation portion on an end of the light weight part 23.

The separate friction part body 20B has a shaft pin which is rotatably coupled to the shaft installation portion.

In more detail, the shaft installation portion has a C shape, and the separate friction part body 20B includes the shaft pin which is rotatably coupled to the C-shaped shaft installation portion, and friction parts which are respectively provided on opposite ends of the shaft pin.

Alternatively, the brake shoe 20 may be configured such that an inward-depressed shaft installation portion is formed in an end of the light weight part 23, and the separate friction part body 20B has a shaft pin corresponding to the inward-depressed shaft installation portion. A structure that is opposite to this is also possible.

As a further alternative, the brake shoe 20 may configured such that a 'U'-shaped shaft installation portion and a coupling depression are formed in an end of the light weight part 23, and the separate friction part body 20B has a shaft pin which is longitudinally coupled to the 'U'-shaped shaft installation portion.

Furthermore, the 'U'-shaped shaft installation portion may be modified into a hole type shaft installation portion which is not open on a lower end thereof.

Figure 12C:
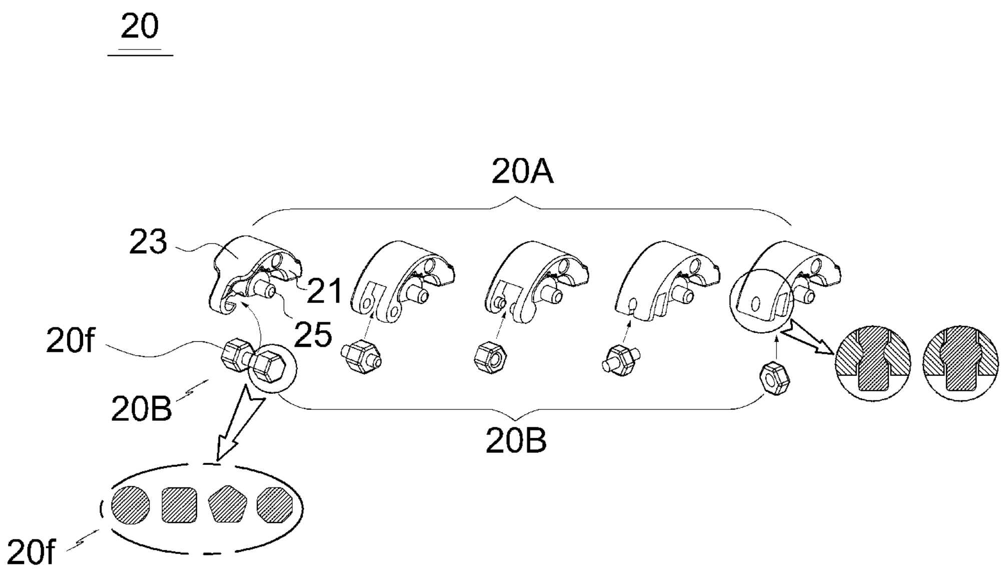

As shown in FIG. 12C, the brake shoe 20 of the present invention may have a three-piece structure. In this case, the brake shoe 20 may be configured such that a shaft pin is integrally formed on an end of a light weight part 23 of a main body 20A, and two friction part bodies 20B are coupled to the shaft pin.

Alternatively, the brake shoe 20 may be configured such that a through hole is formed in an end of a light weight part 23 of a main body 20A, and a separate friction part body 20B includes a first friction part provided with a shaft pin and a second friction part which is coupled to the first friction part through the through hole.

As a further alternative, the brake shoe 20 may be configured such that a shaft installation portion is formed in an end of a light weight part 23 of a main body 20A, and a separate friction part body 20B and a separate shaft pin 23*a* are coupled to the shaft installation portion.

Figure 12D:
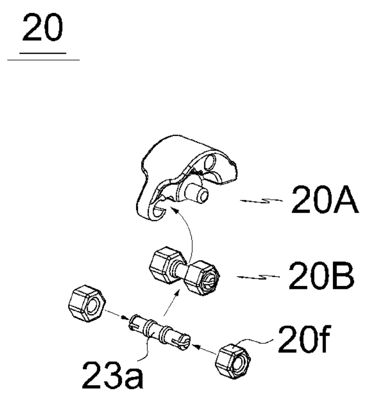

Furthermore, as shown in FIG. 12D, the brake shoe 20 of the present invention may have a four-piece structure. In this case, the brake shoe 20 is configured such that a C-shaped shaft installation portion is formed in an end of a light weight part 23, and a separate friction part body 20B includes two friction parts 20*f* and a shaft pin 23*a*, which are coupled to each other, and is coupled to the C-shaped shaft installation portion.

As such, the brake shoe according to the present invention can be embodied in a variety of shapes which can facilitate a manufacturing process and enhance price competitiveness.

Furthermore, among the different types of brake shoes, in the case of a brake shoe having a separate friction part body 20B provided so as to be rotatable, there is an effect of further increasing the braking force.

That is, when the brake shoe 20 is rotated in one direction by rotation of the spool Sp, the separate friction part body 20B having the friction part 20*f* can rotate with respect to the brake pad 31 in a different direction from that of the rotation of the brake shoe 20, in other words, in a direction perpendicular to the direction in which the brake shoe 20 is rotated.

As such, because the separate friction part body 20B can be rotated by contact friction between the friction part 20*f* and the brake pad 31 in a different direction from that of the rotation of the brake shoe 20, the braking force generated by contact of the brake shoe 20 is increased, thus markedly enhancing the performance as the brake system.

Preferably, the friction part 20*f* of the separate friction part body 20B has a smooth-angled polyhedral structure.

If the rotating force of the spool Sp conflicts with the swinging force of the light weight part 23 resulting from the centrifugal force accompanying the rotating force, and particularly, when the rotating force reaches the maximum and exceeds the swinging force generated by the centrifugal force, the light weight part 23 is finely swung in a direction opposite to the direction of the centrifugal force by repulsive force at the moment it makes contact with the brake pad 31.

At this time, the light weight part 23 is swung again by the centrifugal force and is brought into contact with the brake pad 31.

While such contact is repeated, contact between the light weight part 23 and the brake pad 31 provides the effect similar to an ABS (anti-lock brake system) which is used in a brake system for vehicles or the like.

Compared to braking using continuous contact (friction), braking using intermittently repeated contact can prevent a phenomenon of a reduction in frictional force attributable to heat increased by friction. Therefore, the function and effect of the present invention as the brake system for preventing a backlash phenomenon can be further enhanced.

Figure 12E:
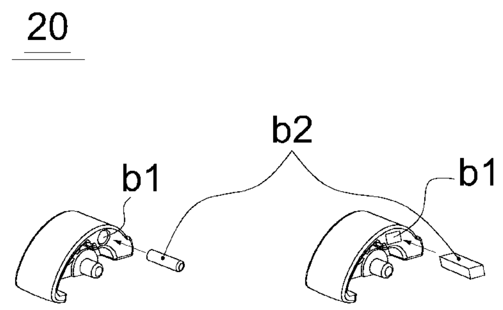

As shown in FIG. 12E illustrating a modification of the brake shoe, the brake shoe may have a hole or depression b1 which is formed in either the heavy weight part or the light weight part or each of both of them. A balance weight b2 which can have various sizes and shapes and be made of various materials is provided in the hole or depression b1.

Furthermore, in a modification embodiment, as necessary, the position of the center of gravity of the brake shoe, and the weight of either the heavy weight or the light weight part or both of them are different for each brake shoe.

Figure 16A:
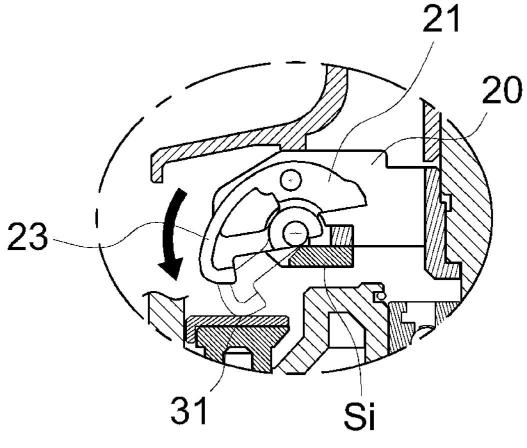
FIGS. 16A through 16C are views illustrating modifications of the brake shoe and a returning means according to the present invention.
Figure 16B:
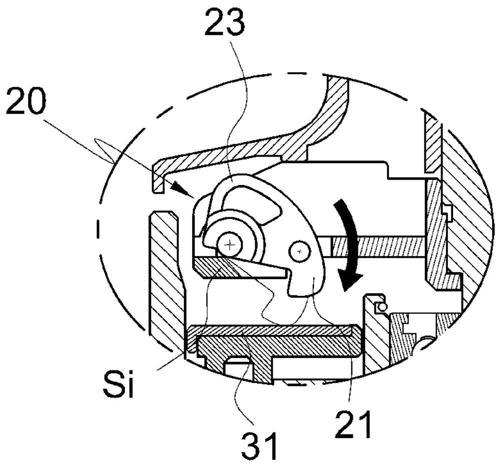

That is, as shown in FIG. 16, the brake shoe according to the present invention may be configured such that the positions of the heavy weight part and the light weight part are opposite to that of the above-stated embodiment, and a friction part is formed on an end of the heavy weight part, whereby the braking force can be varied by the weight of the heavy weight part, and the braking force can be adjusted by changing a position at which the friction part makes contact with the brake disc.

Moreover, as shown in FIG. 15, the present invention may be configured such that radial positions of the brake shoes coupled to the support member are different from each other based on the center axis of the shaft so that action points, at which the friction parts of the brake shoes come into contact with the brake pad of the brake disc and generate braking forces, are different from each other.

In this case, the different radial positions at which the respective brake shoes are coupled to the support member may be fixed.

Alternatively, each of the shaft pin depressions of the support member to which the shaft pin of the corresponding brake shoe is coupled may have a multi-stepped structure so that the radial coupling position can be adjusted when necessary.

As a further alternative, the shaft pin of each brake shoe may be configured such that it slides to allow the brake shoe to be adjusted in position and is fixed at the adjusted position by various methods (bonding, force-fitting, and so on).

Figure 15A:
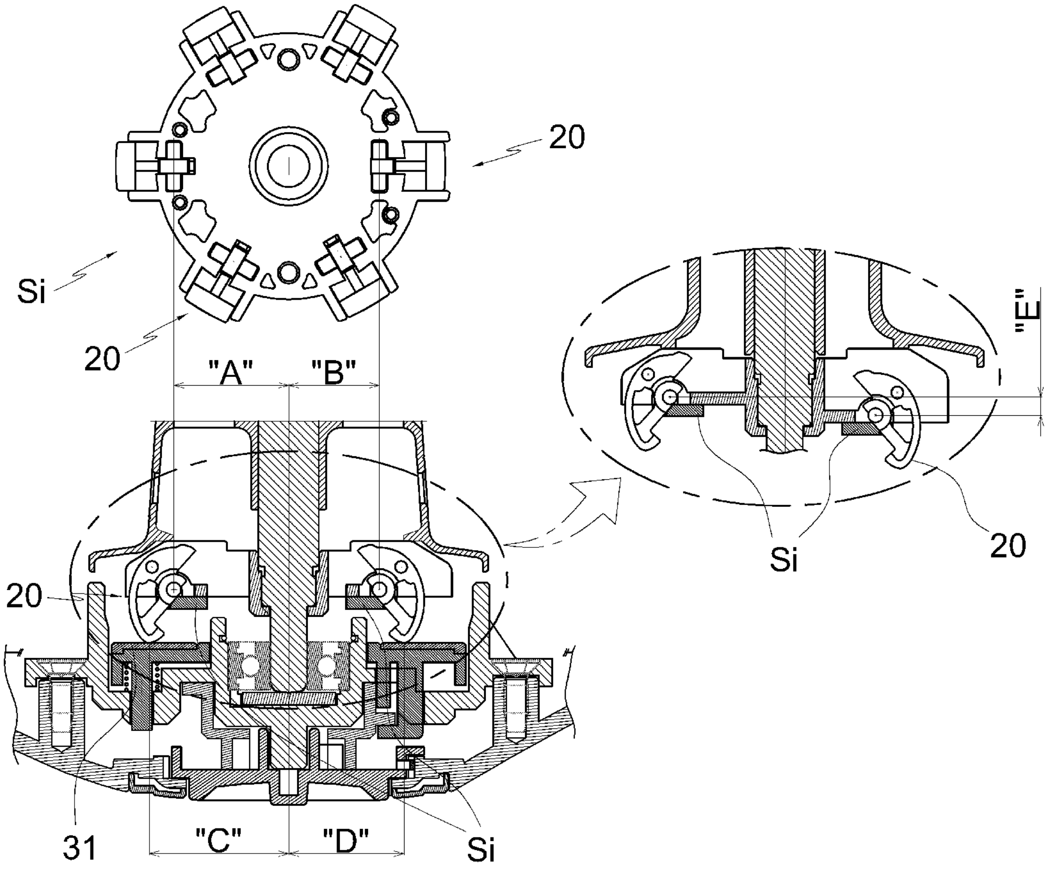
FIGS. 15A and 15B are views illustrating the variable operation of the fishing reel depending on the position of the brake shoe and a modification of a brake pad.
Figure 15B:
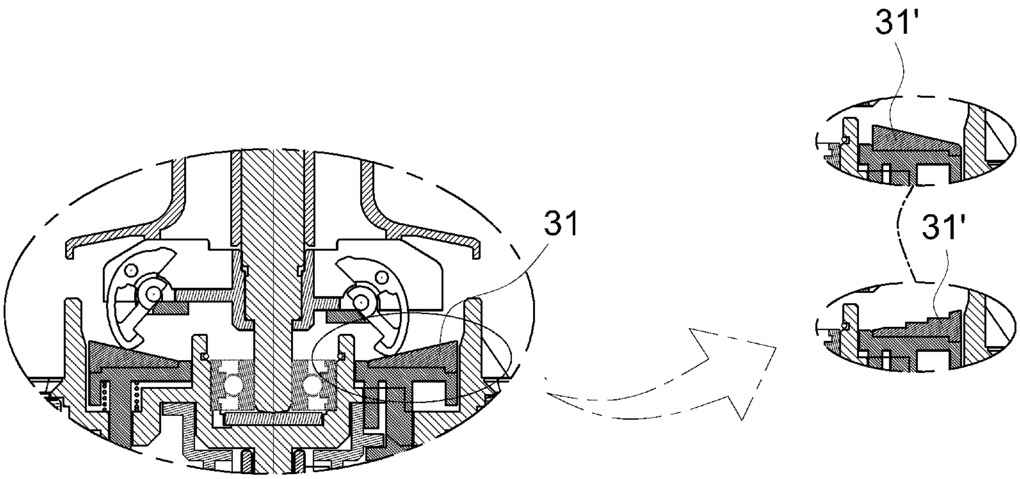

Furthermore, as shown in a sectional view disposed at the right portion of FIG. 15B, coupling portions between the support member 10 and the brake shoes 20 are formed at different heights. In this case, the stoppers St and the brake shoes 20 are combined at different heights by rotating the support member 10 and the connection member Si, whereby the braking force can be adjusted.

That is, the words "radial positions at which the brake shoes 20 are coupled to the support member 10 are different from each other based on the central axis of the shaft" means that, as shown in FIGS. 15A and 15B, the distances between the central axis of the shaft and the respective brake shoes 20 are different from each other; the shaft pins to which the respective brake shoes 20 are coupled are formed on the support member at different positions (heights); or the respective brake shoes 20 are disposed at different positions in such a way that the distances between the brake shoes 20 and the central axis of the shaft are different from each other and the heights from the support member to the brake shoes 20 are different from each other.

The brake pad 31 may be modified into an inclined or stepped brake pad 31' which is increased in height from the central portion to the outer portion. In this case, the braking force can be finely adjusted by the above-mentioned braking force adjustment methods.

For instance, a skilled user can finely adjust the braking force in consideration of several factors such as a target point, target fish species, environment, etc. Moreover, in the case of an unskilled user, it is preferable that he/she tries to finely adjust the braking force to improve his/her fishing skill. Therefore, the present invention can provide the fishing reel having the precise centrifugal brake system which can be set appropriate to the style and skill level of each of all users, thus being very versatile.

Meanwhile, the fishing reel of the present invention is configured such that not only the swing displacement can be adjusted by the stopper St but also a limit unit interlocked to the brake shoe 20 may be provided to allow the user to adjust the braking force.

Figure 17A:
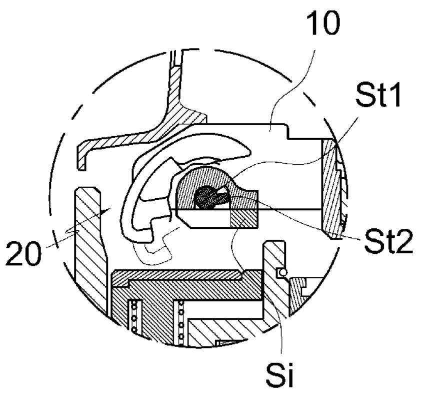
FIGS. 17A through 17C are views illustrating a limit unit of the brake shoe according to the present invention.

For this, as shown in FIG. 17A, the limit unit includes a locking protrusion St2 which is provided on a screw that couples the brake shoe 20 to the support member 10, and a stepped portion St1 which is provided in a shaft installation portion to which the brake shoe is hinged.

It is preferable that the swing displacements of the brake shoes 20 differ from each other to enable the user to selectively adjust the braking force.

Figure 17B:
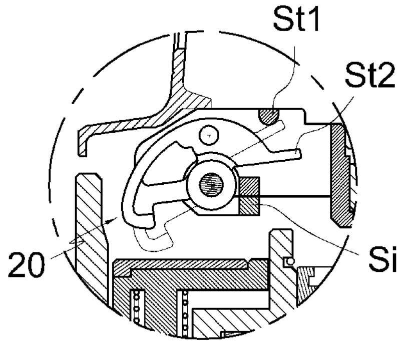

Alternatively, as shown in FIG. 17B, the limit unit may include a locking protrusion St2 which is provided on an end of the heavy weight part of the brake shoe, and a stepped portion St1 which is provided on the spool.

Figure 17C:
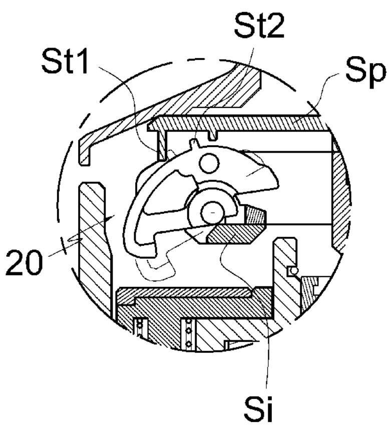

As a further alternative, as shown in FIG. 17C, the limit unit may include a stepped portion St1 which protrudes downwards from an outer edge of a plate part of the spool Sp, and a locking protrusion St2 which is provided on either the heavy weight part or the light weight part of the brake shoe 20 or each of both.

The fishing reel according to the present invention further includes a returning means which is provided in the brake shoe 20 to prevent the brake shoe 20 from making excessive contact with the brake pad 31.

In detail, each brake shoe 20 has the returning means by which it can return to the original position, whereby when the rotational speed of the spool increases and the centrifugal force thus increases, the brake shoe 20 conducts the braking function, and when the centrifugal force is reduced by the braking, the brake shoe 20 returns to its original position and releases the brake pad which has been braked by the brake shoe 20. Thereby, the rotational speed of the spool can be maintained constant.

Figure 16C:
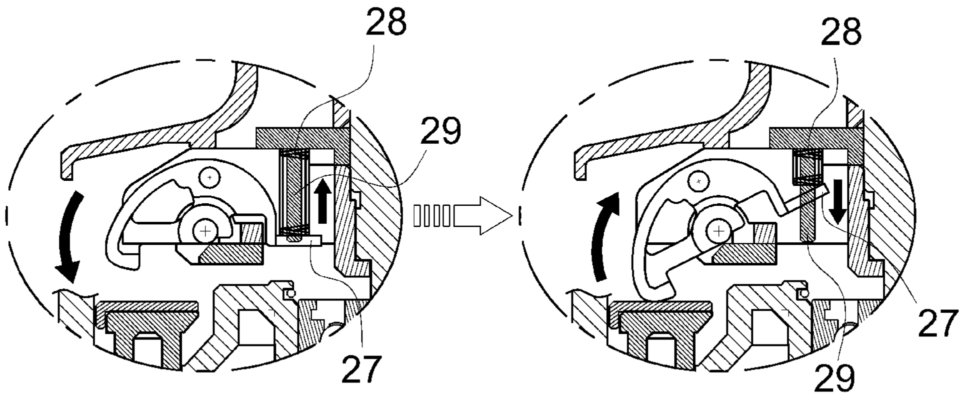

To achieve the above purpose, as shown in FIG. 16C, the returning means of the brake shoe 20 includes a support part 27 which is provided on a noncontact part (in the drawing, an end of the heavy weight part) of the brake shoe 20 and has a through hole (not shown), a support rod 29 which protrudes from the plate part of the spool and is inserted into the through hole of the support part 27, and a coil spring 28 which is interposed between the support part 27 and the support rod 29.

By virtue of the elastic force of the coil spring 28, rather than the brake shoe performing the braking function in ordinary times, only when the centrifugal force generated by rotation of the spool exceeds a predetermined extent can the brake shoe 20 be swung, to conduct the braking function, in a direction opposite to the direction in which the coil spring applies the elastic force to the brake shoe 20.

Such returning and frictional-braking are alternated with each other by the elastic force of the coil spring and the centrifugal force generated by the rotation of the spool (in other words, the generation of friction between the brake shoe 20 and the brake pad is discontinuous). Therefore, the present invention can not only prevent a backlash phenomenon, but can also prevent excessive braking power from reducing the casting distance.

The support member 10 and the connection member Si provided with the stoppers St are coupled to each other by bolts b which are threaded into respective coupling holes 17*b* of the support member 10 and corresponding coupling holes a2 of the connection member Si.

Coupling protrusions a1 are provided on a right side surface of the connection member Si, and coupling holes 17*a* to which the corresponding coupling protrusions are coupled are formed in the support member 10 to facilitate the assembly and reinforce the coupling force or the support force.

The connection member Si also functions as a cover to prevent the brake shoes 20 disposed in the shaft pin depressions 15 of the support member 10 from being undesirably removed therefrom.

The support member 10 may be configured such that it can partially rotate with respect to the connection member Si to enable the connection member si to function as a locking device to turn on/off the operation of the brake shoes.

Figure 13A:
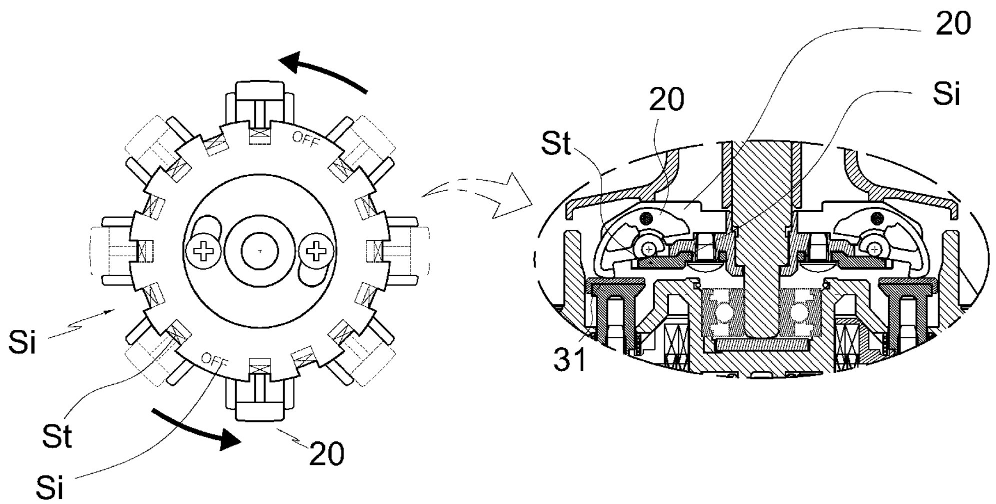
FIGS. 13A, 13B and 14 are views illustrating on/off operation of the brake shoe according to the present invention.
Figure 13B:
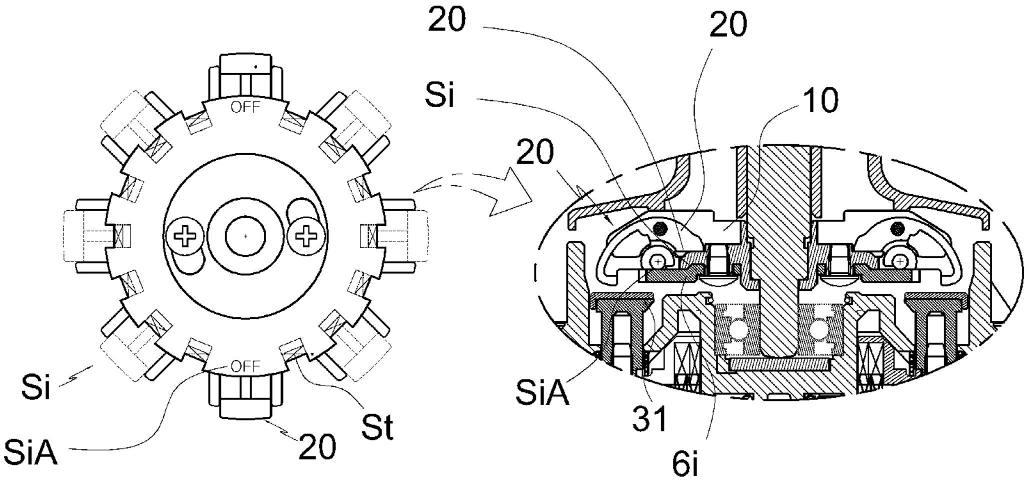
Figure 14:
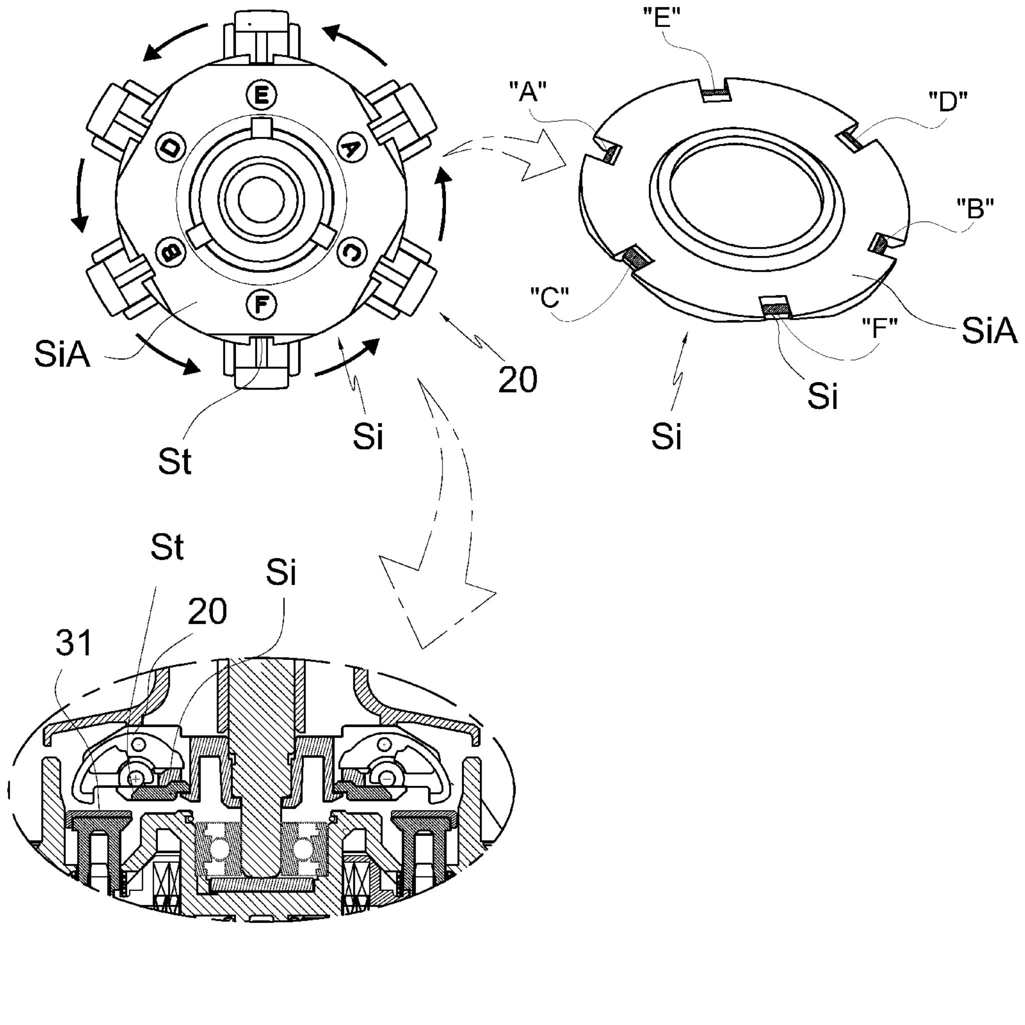

As shown in FIGS. 13A and 13B, the stoppers St each of which has a depressed shape are formed in the connection member Si and arranged in the circumferential direction. Thereby, planar portions SiA are formed between the stoppers St. Thanks to this structure, the connection member Si can function as the locking device in such a way that the planar portions SiA fix the brake shoes 20 such that the brake shoes 20 cannot be swung, whereby the noncontact state between the friction parts of the brake shoes 20 and the brake pad 31 can be maintained.

That is, when the support member 10 is in the On state, the brake shoes are disposed corresponding to the stoppers St of the support member 10, so that the brake shoes can be swung into the corresponding stoppers St by centrifugal force and be brought into contact with the brake pad 31 to generate braking power.

The support member 10 enters the Off state by rotating the support member 10 in one direction such that the brake shoes are disposed at positions corresponding to the planar portions SiA of the connection member Si. When the support member 10 is in the Off state, the brake shoes 20 cannot be swung towards the brake pad 31 by the planar portions SiA.

The brake disc 30 includes an auxiliary disc 33 (aiming to reduce the weight of the brake disc and facilitate a process of forming the brake disc) which is connected to other elements, and the brake pad 31 (having abrasion resistance) which is brought into contact with the friction parts 20*f* of the brake shoes. As such, the brake disc 30 comprises two parts having different functions which are embodied by making them using materials having different properties, whereby the price competitiveness, the quality and the productivity can be enhanced.

The brake pad and the auxiliary disc can be coupled to each other by various methods, for example, force fitting, bonding, bolting, welding, etc.

Furthermore, an interlocking arm 35, which has a locking protrusion 35*a* on an end thereof, and a guide pin 37, which forms a part of a guide means G, are provided on a left side surface of the auxiliary disc 33.

Figure 4:
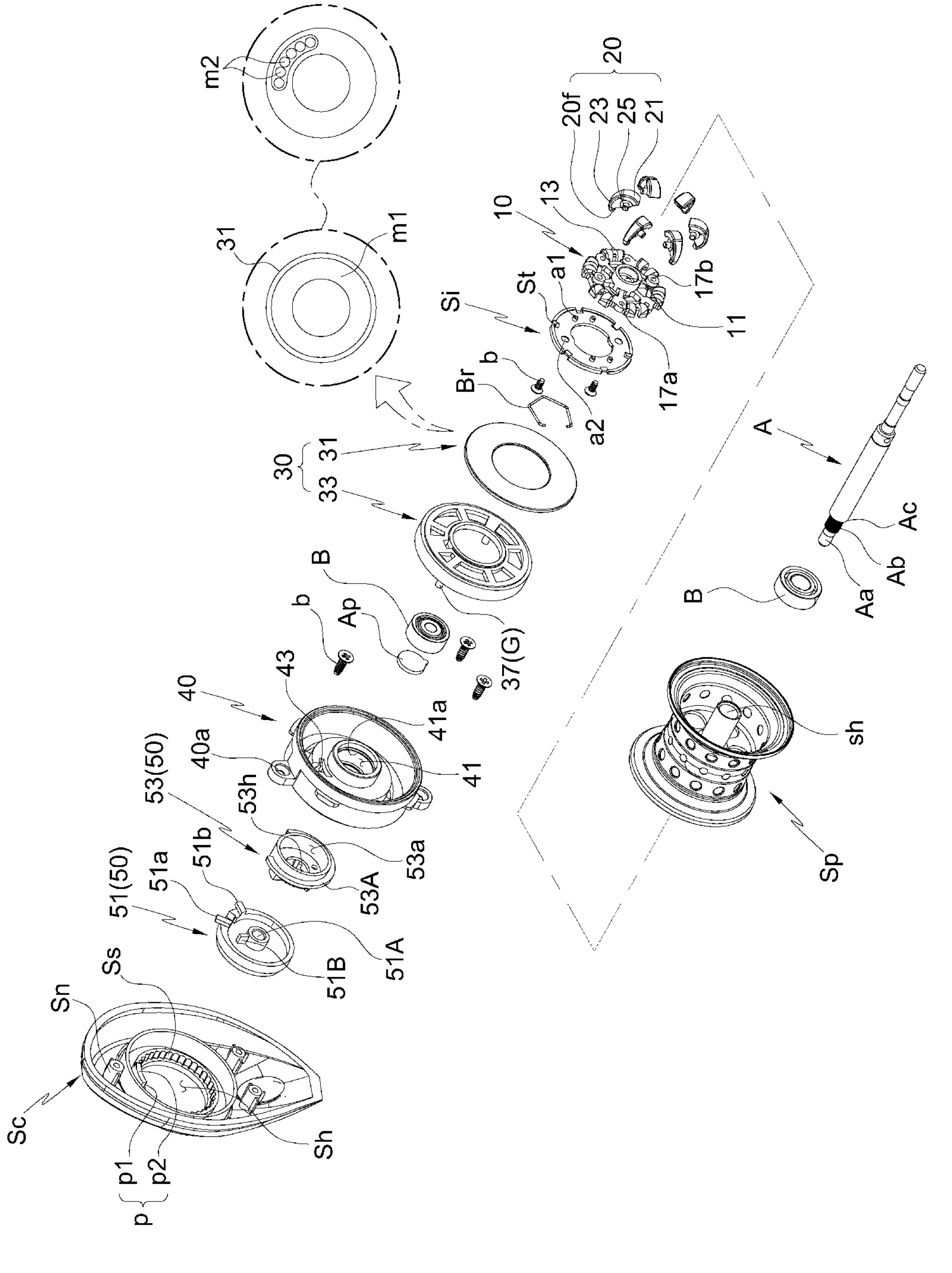
Figure 5A:
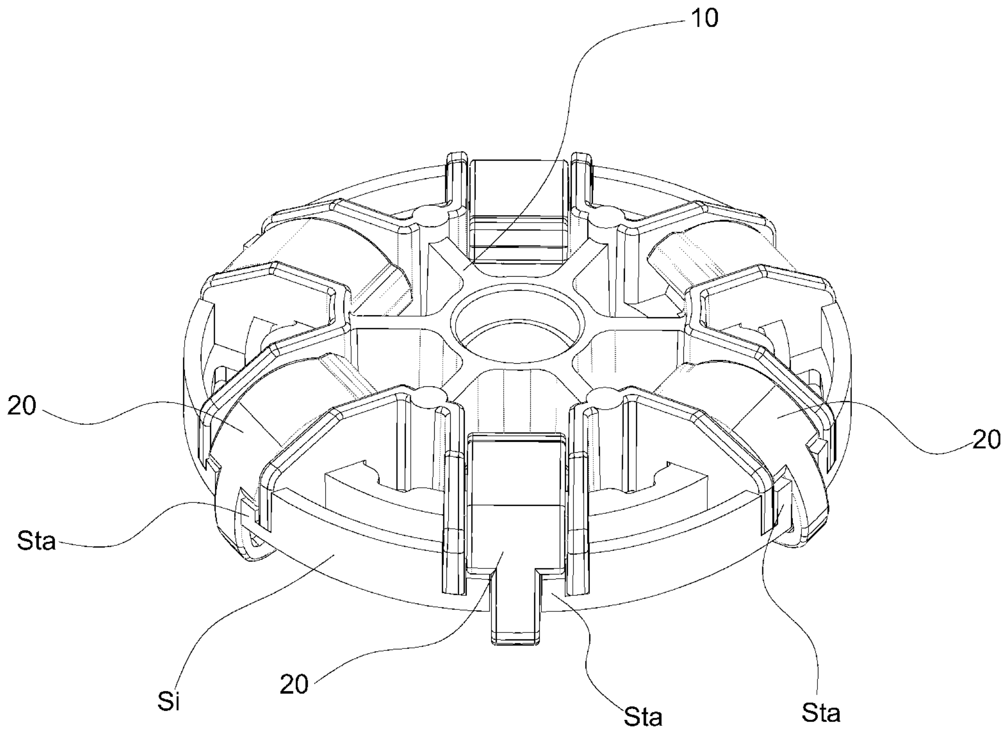
FIGS. 5A through 5D are views illustrating a connection member having protrusion type stoppers according to the present invention.
Figure 5B:
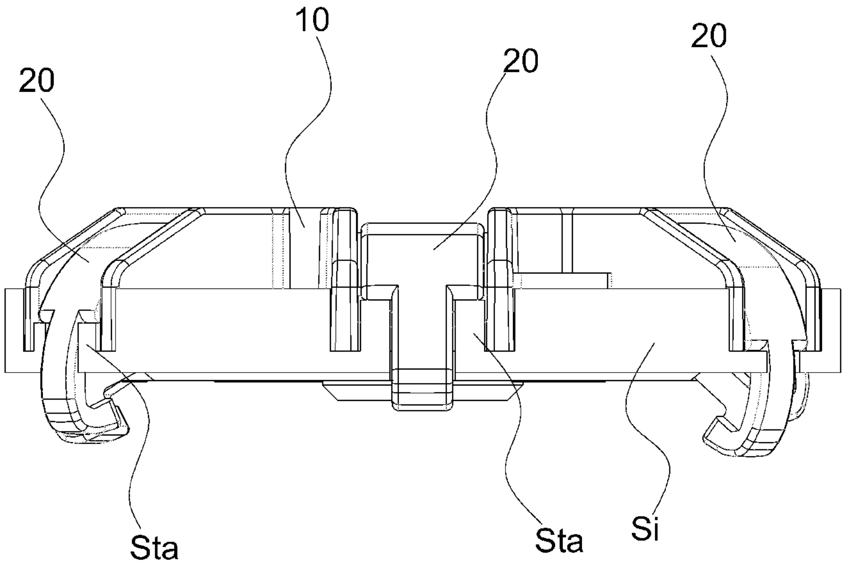
Figure 5C:
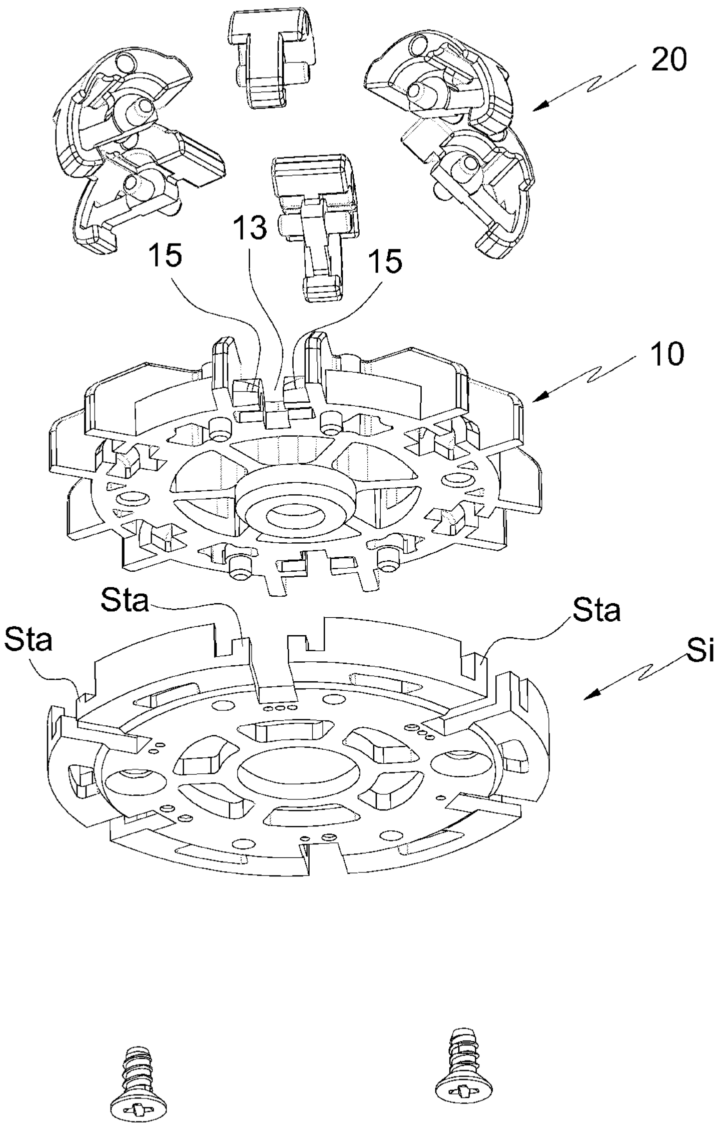
Figure 5D:
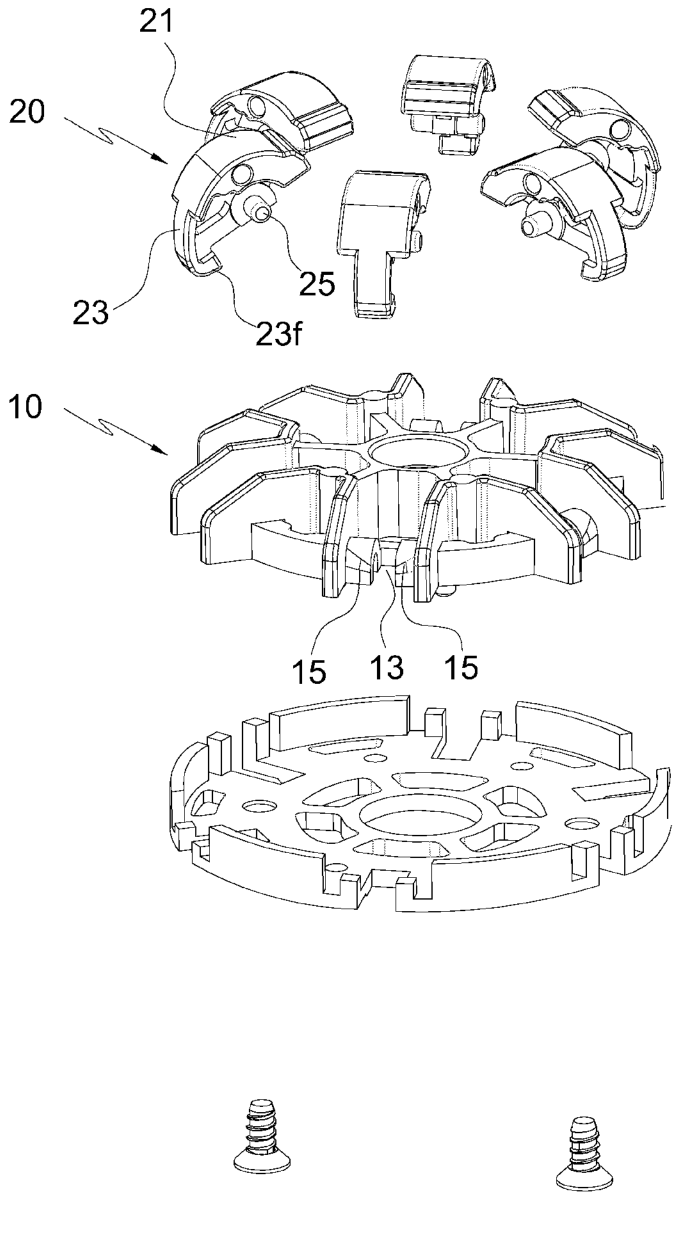

Meanwhile, as shown in FIG. 4, the brake disc, particularly, the brake pad 31, may be made of a permanent magnet m1 to embody a hybrid type brake system including an anti-backlash braking structure using magnetic force.

Figure 6:
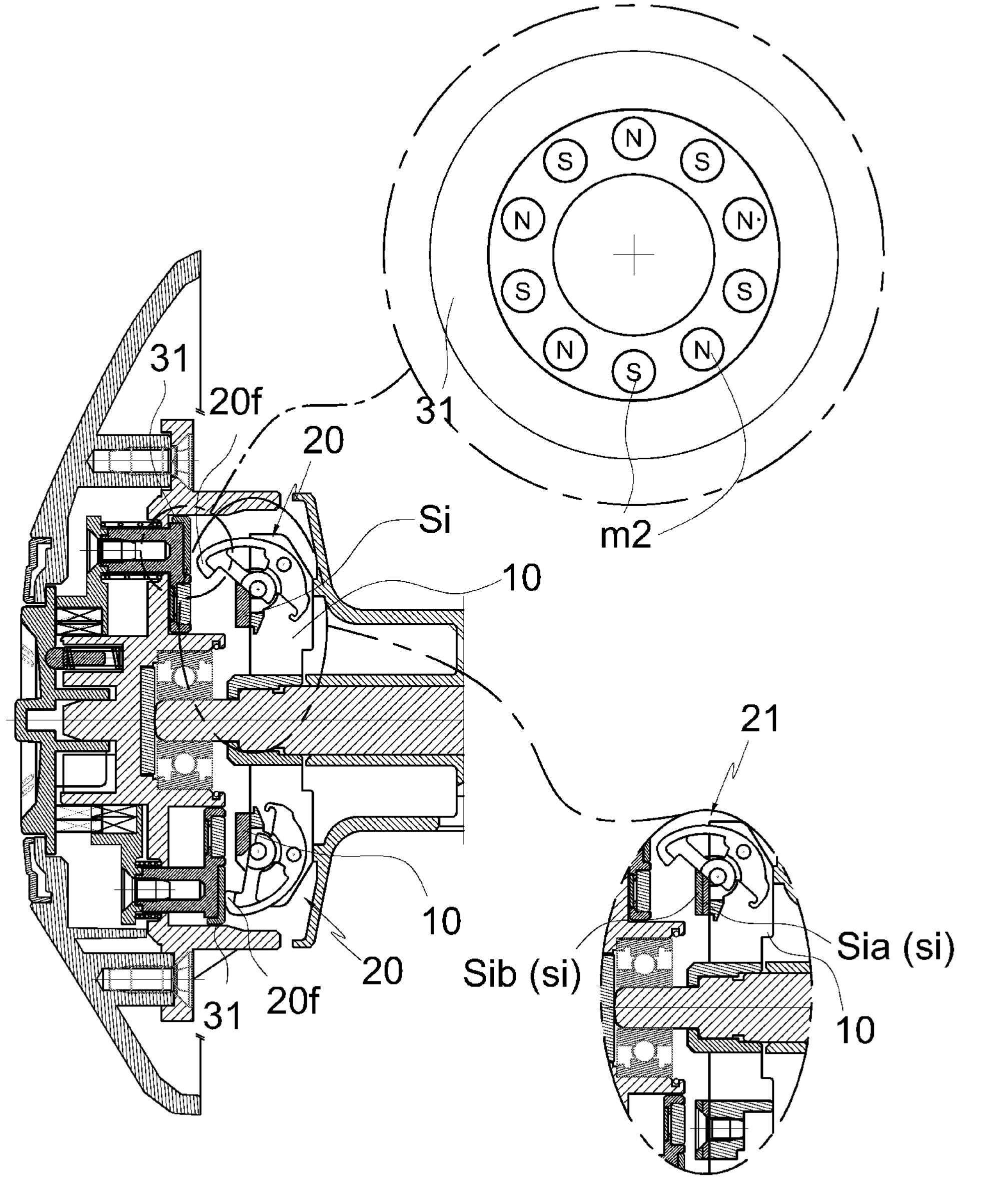
FIG. 6 is a view illustrating a permanent magnet of the precise centrifugal brake system according to the present invention.

Referring to FIGS. 4 and 6, the brake disc 30 may be configured such that small permanent magnets m2 are provided on the brake pad 31 in symmetric arrangement in the same manner as that of a technique proposed in Korean Utility Model Registration No. 20-0345064, filed by the applicant of the present invention on Mar. 4, 2004 [Braking plate operating structure for preventing backlash of spool of bait reel for fishing].

The support member 10 or the connection member Si is made of a non-magnetic conductive material such as aluminum or an aluminum alloy.

In this case, as the distance between the brake disc 30 and the support member 10 or the connection member Si is varied, the support member 10 or the connection member Si which is affected by lines of magnetic force of the permanent magnet m1, m2 functions as a braking panel.

Alternatively, the anti-backlash brake system using magnetic force may be embodied in such a way that the magnetic support member 10 or the connection member Si is made of a permanent magnet, and the brake disc, particularly, the brake pad 31, is made of a non-magnetic conductive material.

Comprehensively, the anti-backlash brake system using magnetic force is introduced in such a way that a permanent magnet is provided in one of the support member 10 and the brake disc 30 which can be adjusted in the distance therebetween, and the other is made of a non-magnetic conductive material.

The mounting drum 40 guides the assembly of the shaft A with other elements and makes interlocking operation between the controller 50 and the brake disc 30 smooth.

The mounting drum 40 includes three coupling protrusions 40*a*, each of which has a through hole, so that the three coupling protrusions 40*a* are respectively coupled to three insert protrusions Sn provided on a right side surface of the side cover Sc by bolts b.

With regard to the shaft A, a receiving recess 41 is formed in a central portion of the right side surface of the mounting drum 40. A protective pad Ap that has superior abrasion resistance and lubricant ability is fitted into the receiving recess 41. Thereafter, the left bearing B is disposed in the receiving recess 41, and a snap ring Br is fitted into an annular depression 41*a*, which is formed in a circumferential inner surface of the receiving recess 41, thus fixing the left bearing B in the receiving recess 41. Subsequently, the support end Aa of the shaft A is coupled into a central hole of the bearing B so that the support end Aa is rotatably supported by the bearing B.

With regard to the brake disc 30, the guide pin 37 of the auxiliary disc 33 to which the brake pad 31 is firmly fastened is inserted into a guide hole 47 formed in the receiving recess 41.

The guide pin 37 and the guide hole 47 constitute the guide means G which functions to make smooth movement of the brake disc 30 when the brake disc 30 is moved forwards or backwards by the controller.

Furthermore, the interlocking arm 35 provided on the left side surface of the auxiliary disc 33 of the brake disc 30 protrudes to the left from the left side surface of the mounting drum through a through hole 43.

With regard to the controller 50, a first shaft protrusion 45A and a second shaft protrusion 45B are provided on a central portion of the left side surface of the mounting drum 40.

The second shaft protrusion 45B that has a comparatively small outer diameter is coupled to a shaft hole 51A of a dial 51 which forms a part of the controller.

Further, the first shaft protrusion 45A which has a larger outer diameter than that of the second shaft protrusion 45B is inserted into a seating depression 53*a* of an intermediate member 53.

Meanwhile, as stated above, the core concept of the controller 50 is that the braking power can be precisely controlled in such a way that the distance between the brake shoes 20 and the brake pad 31 is adjusted by moving the brake disc 30.

Above all things, in terms of convenience in use, it is essential for the fishing reel to be configured such that the user can easily move the brake disc which is disposed inside the side cover Sc.

For this, the controller 50 has the dial 51. The dial 51 is disposed in a central coupling hole Sh of the side cover Sc so that it can be smoothly rotated in one place.

The coupling of the dial to the side cover and the rotation of the dial with respect to the side cover may be embodied in such a way that the dial is moved forwards or backwards in a threaded coupling manner.

More preferably, to enhance the durability, prevent foreign substances from entering the reel, and provide elegant appearance and characteristics of a high quality and high-end product, it is preferable that the dial 51 is rotated in one place.

Furthermore, it is preferable that the dial 51 is configured such that handling is smooth, the extent of the braking power can be indicated, the braking power can be precisely adjusted, and the dial 51 can be prevented from being undesirably rotated.

To achieve the above-mentioned purposes, an internal gear type multi-stop part Ss is formed on a circumferential inner surface of the coupling hole Sh of the side cover Sc, particularly, on a right (inner) portion of the circumferential inner surface of the coupling hole Sh to prevent the multi-stop part Ss from being exposed to the outside after the dial 51 has been assembled with the side cover Sc.

Furthermore, a C-shaped click-sound generation spring is provided in a rim of the dial 51, and includes a pair of arc-shaped elastic arms and a protrusion which is integrally provided between the arc-shaped arms. The C-shaped click-sound generation spring is mounted to the dial 51 by fitting the arc-shaped elastic arms into the circumferential inner surface of the rim of the dial 51.

The dial 51 has two protrusions 51*a* and 51*b* which limit rotation of the dial 51, that is, determine a start point and an end point of the rotation of the dial 51. The protrusion of the click-sound generation spring is disposed between the two protrusions 51*a* and 51*b* of the dial 51 and is brought into elastic contact with the multi-stop part Ss, thus generating a click sound. In this way, stepwise rotation of the dial can be embodied.

As necessary, a gear type multi-stop part may be formed around a circumferential outer surface of the dial 51, and a different shape of click-sound generation spring may be installed in the side cover Sc.

When the dial 51 is assembled with the side cover Sc, the dial 51 is inserted into the coupling hole Sh of the side cover Sc from the right side of the side cover Sc to the left side thereof.

As shown in FIGS. 1 and 3, the dial 51 has a stepped circumferential outer surface. A right large-diameter part of the stepped outer surface is stopped by a circumferential portion that defines the side cover coupling hole Sh, whereby the dial 51 can be prevented from being removed to the left from the coupling hole.

Furthermore, the dial 51 includes a cylindrical sleeve which has a shaft hole 51A into which the second shaft protrusion 45B of the mounting drum 40 is inserted. An interlocking protrusion 51B is provided on a circumferential outer surface of the cylindrical sleeve. A grip 51*k* is provided on an outer surface of the dial 51.

The start and end protrusions 51*a* and 51*b* of the dial are brought into contact with a start and end protrusion p of the side cover Sc to limit an angle at which the dial can be rotated.

Meanwhile, in terms of separation of the function and facilitation of manufacture and assembly, it is preferable that the controller 50 includes the intermediate member 53 which moves the brake disc 30 forwards or backwards when the dial 51 coupled to the side cover Sc is rotated.

The intermediate member 53 has a spiral protrusion 53A on a circumferential outer surface thereof. The interlocking arm 35 of the auxiliary disc 33 of the brake disc 30 is locked to the spiral protrusion 53A by the locking protrusion 35*a* provided on the end of the interlocking arm 35.

The second shaft protrusion 45B of the mounting drum 40 is coupled into the shaft hole 51A of the dial 51 through a through hole 53*h* of the intermediate member 53.

The seating depression 53*a* into which the first shaft protrusion 45A of the mounting drum is inserted is formed around the through hole 53*h*.

Furthermore, an interlocking depression 53B is formed in a left side surface of the intermediate member 53. The interlocking protrusion 51B of the dial 51 is coupled into the interlocking depression 53B so that when the dial 51 is rotated, the rotating force is transmitted from the dial 51 to the intermediate member 53 through the interlocking protrusion 51B and the interlocking depression 53B.

In addition, balance protrusions 53*b* are provided on the left side surface of the intermediate member 53 at positions corresponding to two vertexes of a triangle formed by the two balance protrusions 53*b* and a protrusion that defines the interlocking depression 53B. The balance protrusions 53*b* function as spacers to maintain the distance between the right side surface of the dial 51 and the left side surface of the intermediate member 53 constant.

In the controller 50 having the above-mentioned construction, when the user rotates the dial 51, the protrusion of the click-sound generation spring engages with the multi-stop part Ss of the side cover Sc, thus making stepped and controlled rotation of the dial 51 possible, and generating a click sound.

Then, because the interlocking protrusion 51B of the dial 51 which is rotated in one place is coupled to the interlocking depression 53B of the intermediate member 53, the intermediate member 53 which is provided around the first shaft protrusion 45A of the mounting drum 40 is also rotated in one place.

The rotation of the intermediate member 53 is converted into linear motion of the interlocking arm 35, that is, linear motion of the auxiliary disc 33 and the brake pad 31, because the locking protrusion 35*a* of the interlocking arm 35 is being brought into contact with a left side surface of the spiral protrusion 53A of the intermediate member 53.

Here, by virtue of the guide means G that includes the guide pin 37 of the auxiliary disc and the guide hole 47 of the mounting drum 40, the brake disc 30 can be smoothly and reliably moved forwards or backwards.

As the brake disc 30 moves forwards or backwards, the distance between the brake pad 31 and the brake shoes 20 is adjusted.

When the start protrusion 51*a* or the end protrusion 51*b* of the dial 51 comes into contact with a start surface p1 or an end surface p2 of the start and end protrusion p of the side cover Sc, left rotation or right rotation of the dial 51 is restricted. At this time, the forward or backward movement of the brake disc 30 is also restricted.

When the brake disc 30 is moved backwards to the leftmost position, in other words, when the distance between the brake pad 31 and the friction parts 20*f* of the brake shoes 20 is largest, the braking power of the precise centrifugal brake system preferably become zero.

Figure 2A:
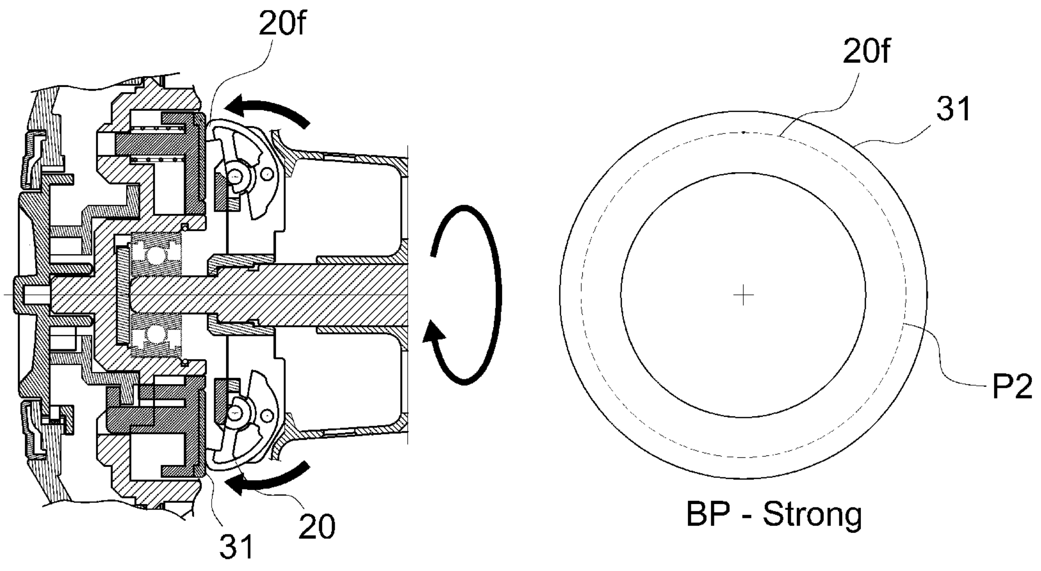
FIGS. 2A through 2E illustrate the operation of brake shoes of the fishing reel and variation in braking force of the fishing reel depending on orientation of the brake shoes according to the present invention.

As shown in FIG. 2A, when the distance between the brake pad 31 and the brake shoes 20, in detail, the friction parts 20*f* of the brake shoes 20, is comparatively short, contact points P1 at which the friction parts 20*f* of the brake shoes make contact with the brake pad 31 are formed in a perimeter of the brake pad 31 which is comparatively far from the center of the brake pad 31. In this case, the braking power BP is comparatively large (strong).

Figure 2B:
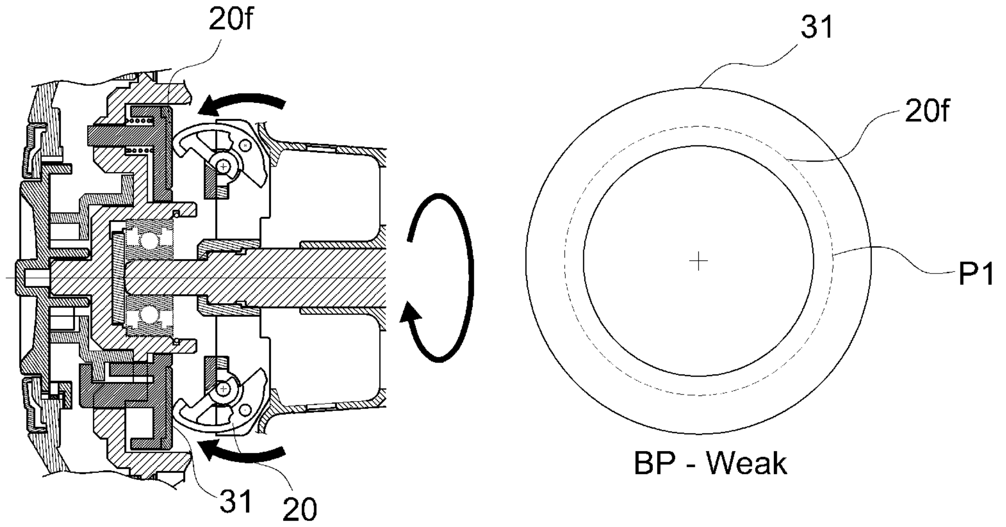
Figure 2C:
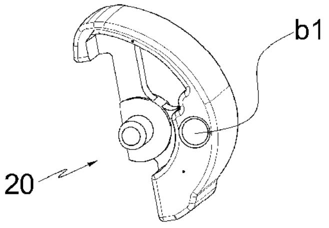
Figure 2D:
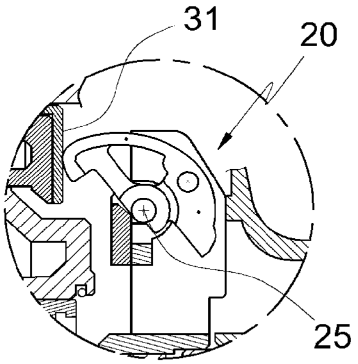
Figure 2E:
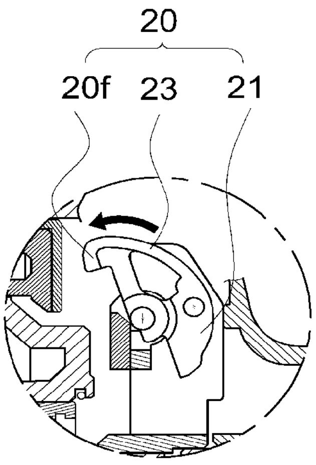

On the other hand, as shown in FIG. 2B, when the distance between the brake pad 31 and the brake shoes 20, in detail, the friction parts 20*f* of the brake shoes 20, is comparatively long, the contact points P1 at which the friction parts 20*f* of the brake shoes 20 make contact with the brake pad 31 are formed at positions which are comparatively close to the center of the brake pad 31. Therefore, the braking power BP is comparatively small (weak).

As necessary, the controller which adjusts the distance between the brake disc 30 and the brake shoes 20 and precisely controls the braking power may be modified into a structure in which, rather than the brake disc 30, the support member provided with the brake shoes, is moved to control the braking power.

Meanwhile, in the precise centrifugal brake system according to the present invention, as shown in FIGS. 8 through 11, it is preferable that the brake shoe further includes a locking means which turns off the braking function.

The locking means can be embodied by a variety of methods to prevent the brake shoe from being swung.

Figure 8A:
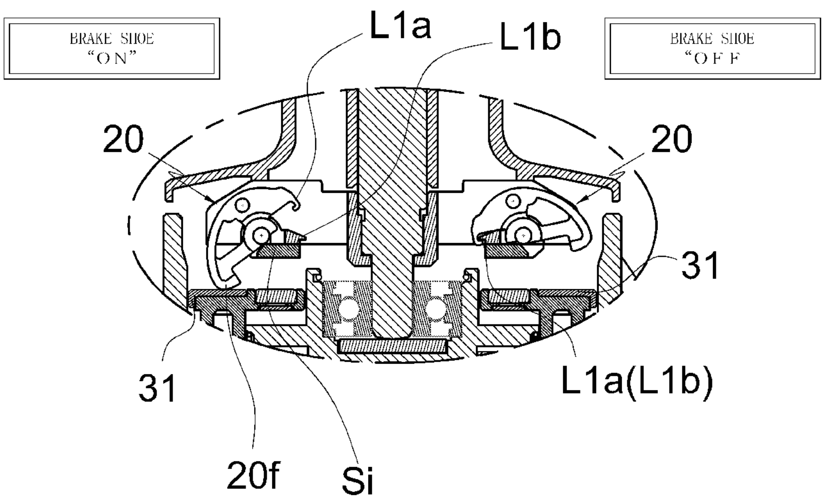
FIGS. 8A, 8B, 9A, 9B, 10A, 10B, 11A and 11B are views illustrating a locking means according to the present invention.
Figure 8B:
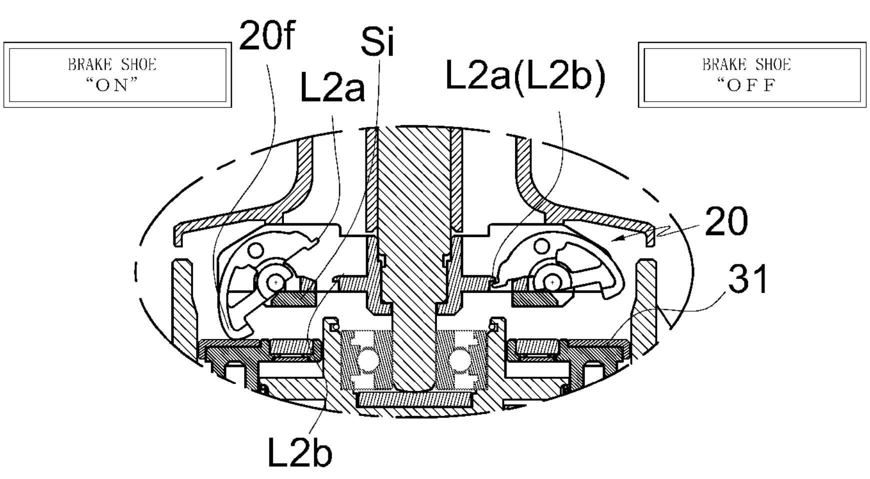

In detail, as shown in FIGS. 8A and 8B, a locking means L1*a* and L1*b* or L2*a* and L2*b* may be embodied in such a way that the heavy weight part of the brake shoe 20 is locked to the support member 10 in a protrusion-depression engagement manner. When the locking means enters the locked state, the brake shoe 20 is maintained in an upright state. In this case, even when the spool is rotating, the brake shoe 20 does not contact the brake pad 31.

Figure 9A:
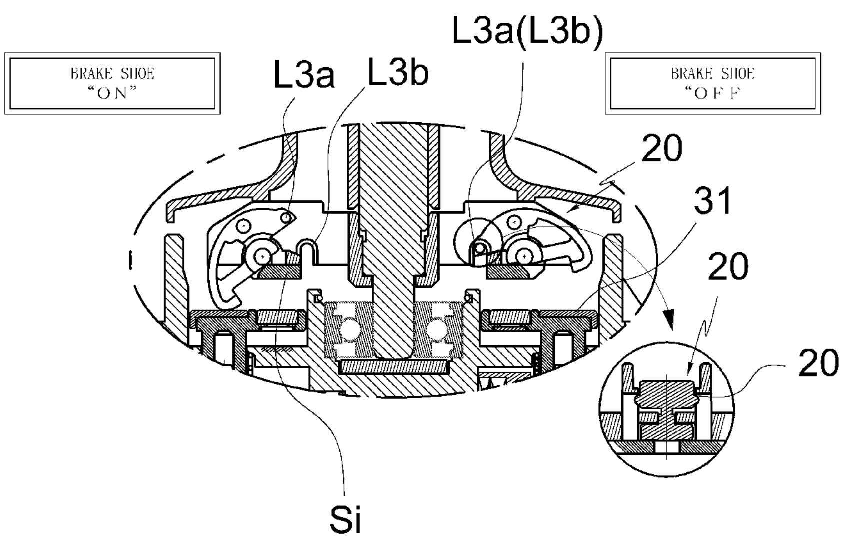
Figure 9B:
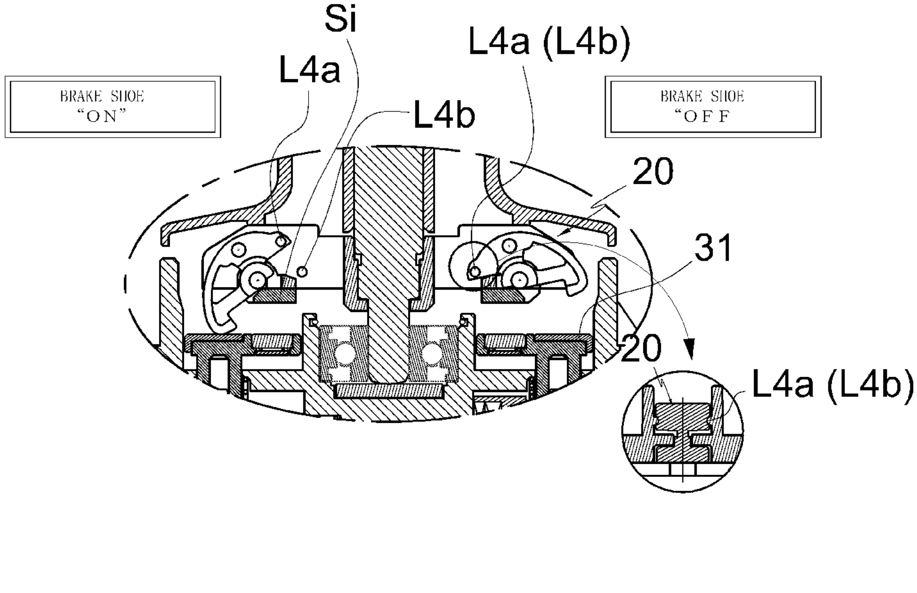

As shown in FIGS. 9A and 9B, the locking means according to the present invention may be modified into a locking means L3*a* and L3*b* or L4*a* and L4*b* that include a protrusion and a locking depression which are respectively provided on the heavy weight part of the brake shoe 20 and the support member 10.

Figure 10A:
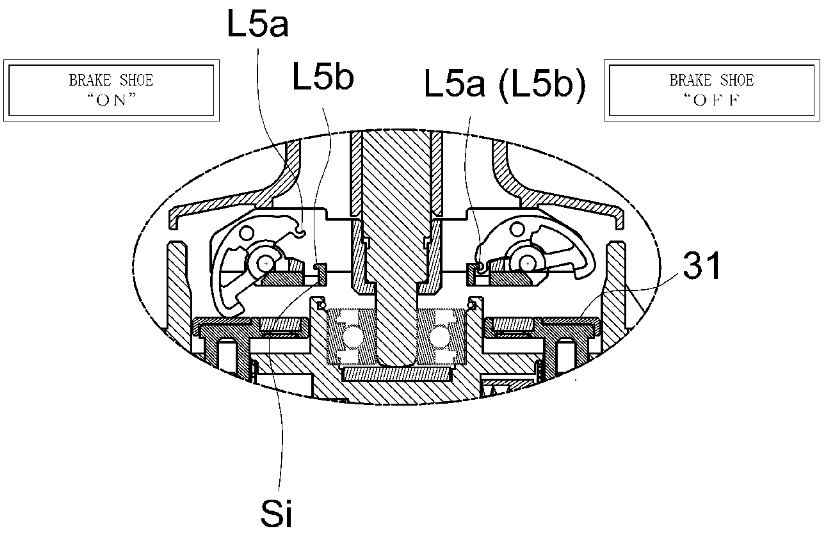
Figure 10B:
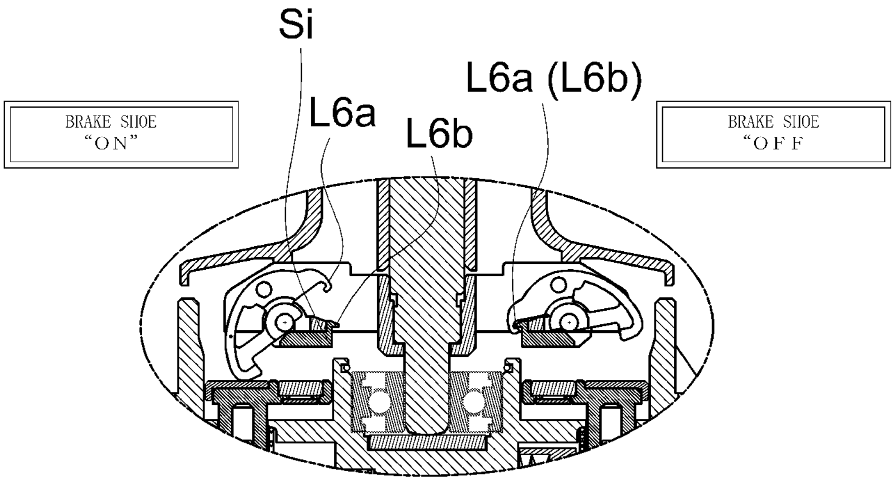

Furthermore, as shown in FIGS. 10A and 10B, the locking means according to the present invention may comprise a protrusion-depression engagement type locking means L5*a* and L5*b* or L6*a* and L6*b* which is provided on the heavy weight part of the brake shoe 20 and the connection member Si so that the brake shoe 20 can be selectively maintained in an upright state.

Figure 11A:
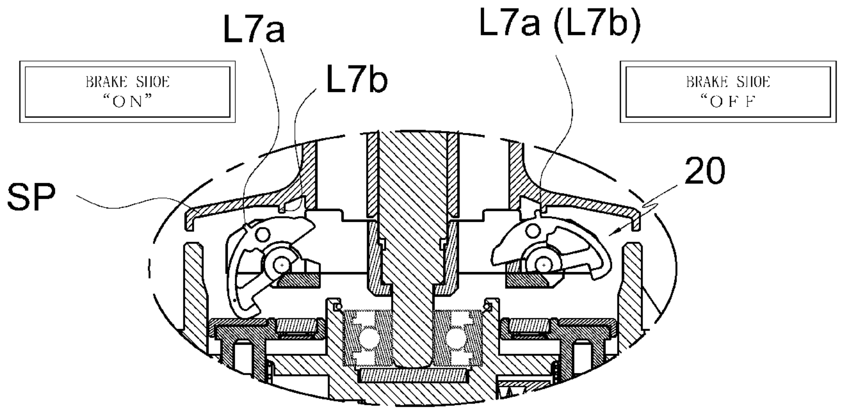

As shown in FIG. 11A, the locking means according to the present invention may be modified into a locking means L7*a* and L7*b* which includes a protrusion that protrudes outwards from the brake shoe 20 between the heavy weight part and the light weight part, and a locking protrusion that protrudes inwards from the spool.

Figure 11B:
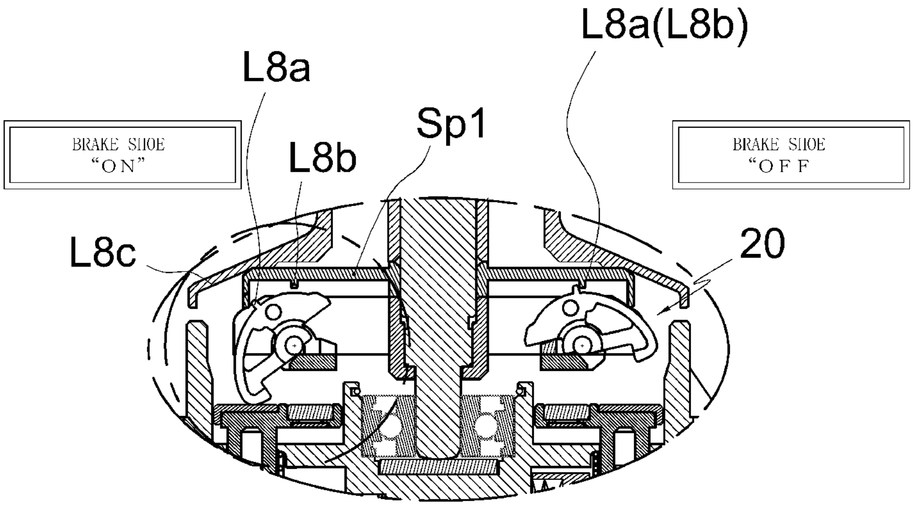

As shown in FIG. 11B, the locking means may be configured in such a way that a protrusion protrudes outwards from the brake shoe 20 between the heavy weight part and the light weight part and a locking protrusion protrudes inwards from a spool plate which functions as a cover of the spool.

To operate the locking means which can be embodied in various ways, the user opens the side cover and pushes the friction parts 20*f* of a desired number of brake shoes upwards such that the brake shoes enter the locked state through the locking means.

As stated above, the brake system according to the present invention is provided to prevent a backlash phenomenon when casting. The essential purpose of the present invention is to prevent a casting distance from being reduced by the backlash phenomenon or prevent a fishing line from being entangled by the backlash phenomenon, causing a casting failure.

If the braking power exceeds the required braking power, a problem of a reduction in the casting distance may be caused by reduced rotating force of the spool Sp.

However, in the brake system according to the present invention, the distances between the brake shoes 20 and the brake pad 31 are set to be different from each other so that the braking power can be precisely adjusted.

Therefore, the problem of a reduction in the casting distance that results from an increase of the braking power can be minimized using the controller 50.

In addition, the braking function of each brake shoe 20 can be selectively turned off by a corresponding locking means.

Hence, the problem of a reduction in the casting distance can be further mitigated. In a second embodiment in which the brake shoe 20 has increased braking power, a range of variation of the braking power is increased so that a user can selectively determine the extent of the braking power and more easily and variously determine the casting distance.

Figure 18:
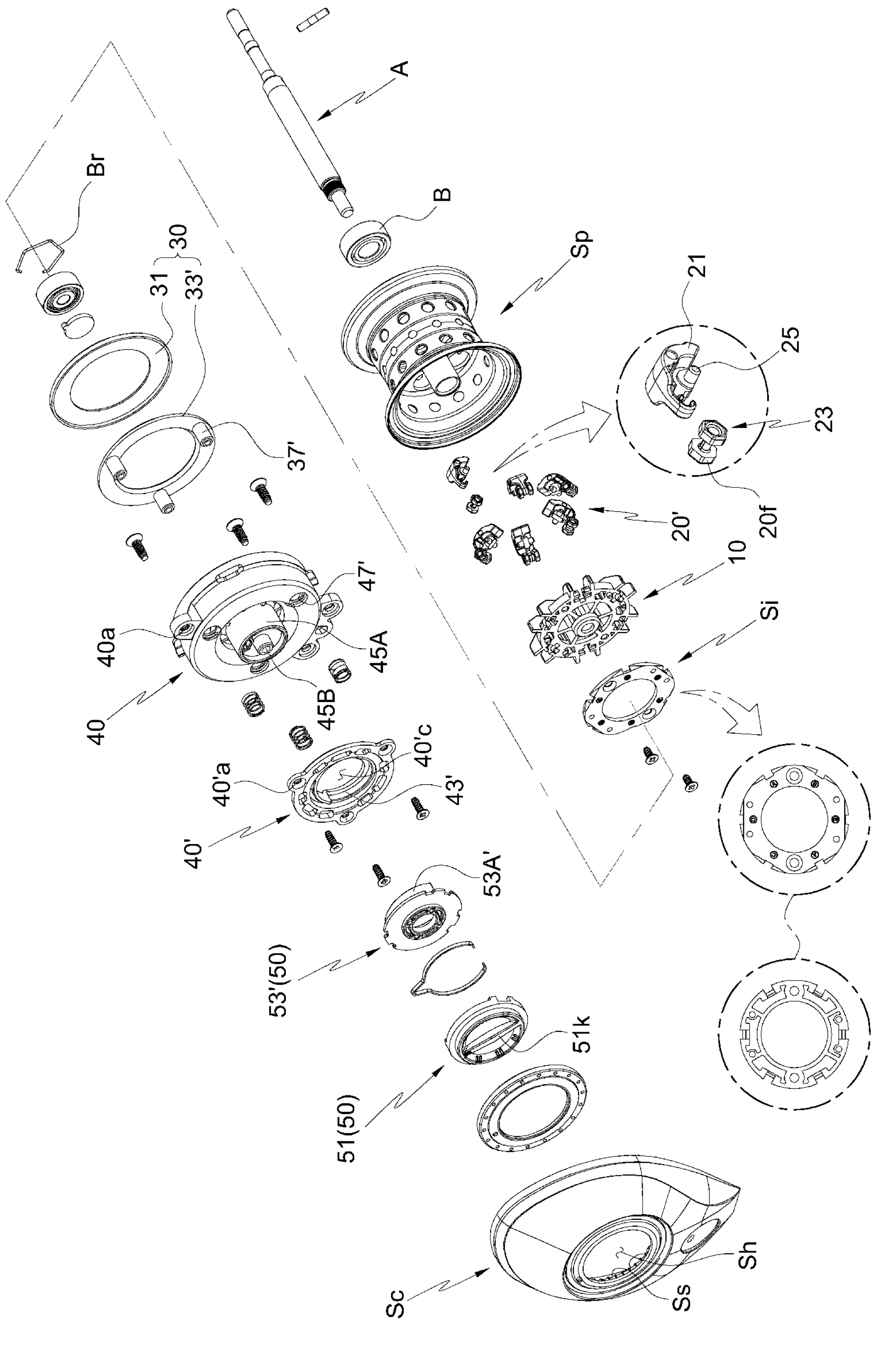
FIGS. 18 and 19 are exploded perspective views showing a critical part of a fishing reel having a modification of the brake shoe according to the present invention.
Figure 19:
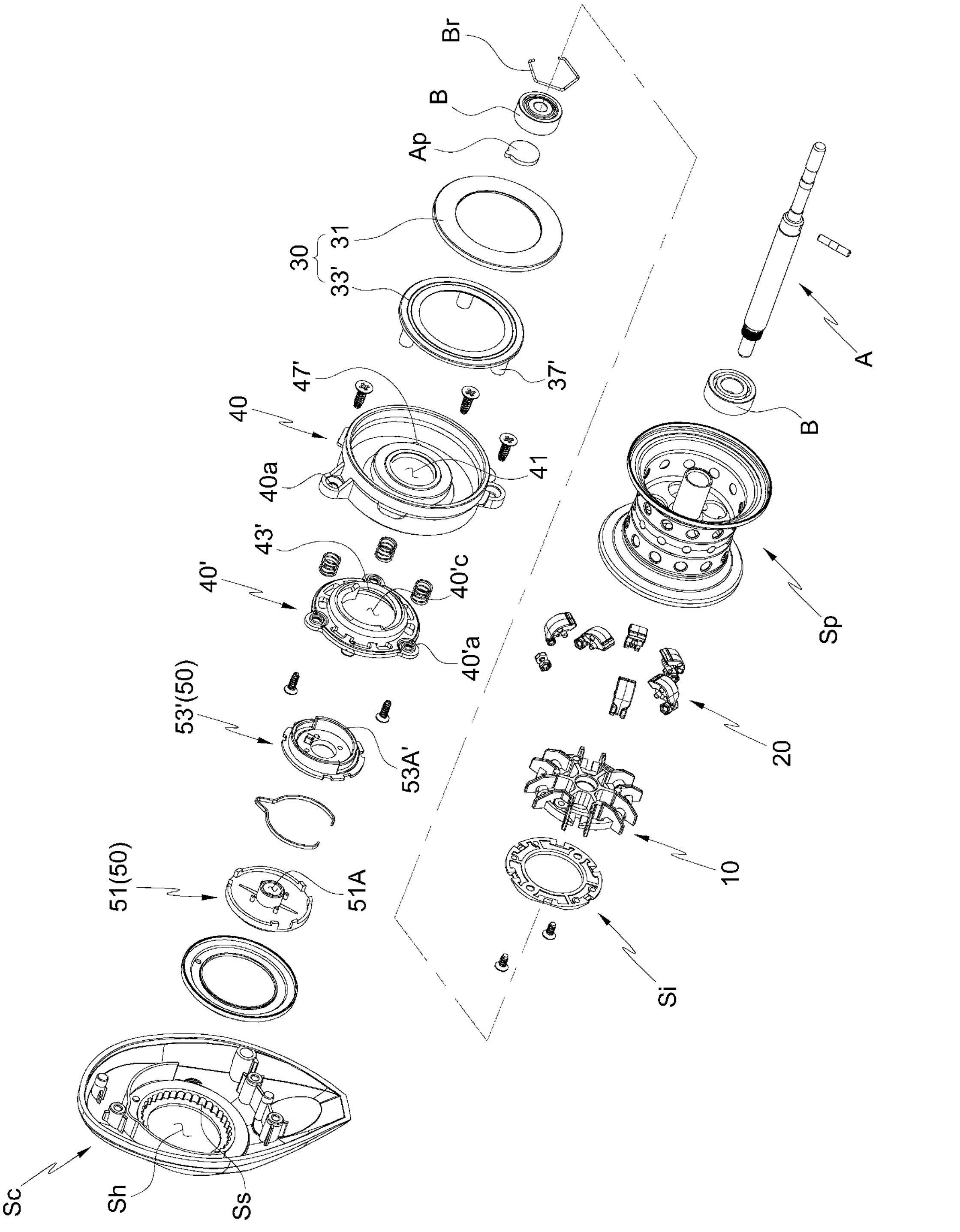

As shown in FIGS. 18 and 19, the second embodiment of the present invention provides a modification of a means for moving the brake disc 30 forwards or backwards using the controller 50, in other words, a modification of the intermediate member 53, thus making the forward or backward movement of the brake disc 30 smoother, and the manufacturing and assembling processes more easier.

For this, the intermediate member 53 is coupled to a dial to form a controller, and includes a spiral side wall 53A' which protrudes to the right from the intermediate member 53 such that the height of the spiral side wall 53A' varies to have a spiral shape.

A displacement drum 40' which has a spiral depression 43' corresponding to the spiral side wall 53A' is coupled to a mounting drum 40 in a sliding manner.

Preferably, the displacement drum 40' is coupled to an auxiliary disc 33 of the brake disc 30.

To make the forward or backward movement of the brake disc 30 smooth, the displacement drum 40' has in a central portion thereof an opening 40'*c* which is defined by a portion in which the spiral depression 43' is formed.

As described above, the intermediate member 53 is rotated in one place along with the dial 51.

Then, the position of a contact portion between the spiral side wall 53A' and the spiral depression 43' is varied by the rotation of the spiral side wall 53A', whereby the displacement drum 40' and the brake disc 30 are moved forwards or backwards.

That is, after the intermediate member 53 has been inserted into the opening 40'*c*, the displacement drum 40' is moved forwards or backwards by making contact between the spiral side wall 53A' and the spiral depression 43'.

For this, the auxiliary disc 33 includes a guide pin 37 which has an insert hole into which a bolt or the like is coupled.

The mounting drum 40 has a guide hole 47 through which the guide pin 37 passes.

The displacement drum 40' has a through hole 40'*a* into which a fastening member such as a bolt is inserted to couple the displacement drum 40' to the guide pin 37. Thus, the auxiliary disc 33 and the displacement drum 40' are coupled to each other by bolting.

As the intermediate member is rotated, an assembly of the brake disc and the displacement drum is moved forwards or backwards.

The guide hole and the guide pin function as a guide means for guiding linear movement of the assembly of the brake disc and the displacement drum forward or backward.

Furthermore, a coil spring is provided inside the guide hole 47 of the mounting drum 40, that is, between the through hole 40'*a* of the displacement drum 40' and the guide pin 37 of the auxiliary disc 33.

When the brake disc including the auxiliary disc is moved forwards or backwards, they are biased to their original position by the coil spring.

In more detail, the coil spring elastically supports the displacement drum on the mounting drum.

When the intermediate member is rotated in one direction and the displacement drum and the brake disc are moved inwards, that is, rightwards, the spring coil is contracted and the elastic force of the coil spring is applied to the displacement drum and the brake disc in the opposite direction.

In this state, when the intermediate member is rotated in the other direction, the displacement drum and the brake disc are moved outwards, that is, leftwards, by the elastic force of the coil spring.

In the description of the second embodiment of the present invention, the constructions of a controller 50, a side cover Sc, a click-sound generation spring, a connection member Si, a permanent magnet and a support member 10 and the connection relationship among them will be omitted, because they are almost the same as those of the first embodiment, so that those skilled in the art can easily embody them.

Furthermore, in the above-mentioned description, although the well known techniques associated with various sphere structures of the fishing reel have been omitted, those skilled in the art will be able to easily deduce and embody them.

While the preferred embodiments of the fishing reel and the precise centrifugal brake system according to the present invention have been disclosed for illustrative purposes, those skilled in the art will appreciate that various modifications, additions and substitutions are possible, without departing from the scope and spirit of the invention as disclosed in the accompanying claims.

What is claimed is:

1. A fishing reel, comprising:

a frame;

a shaft coupled to the frame;

a spool provided on the shaft to allow a fishing line to be wound around the spool; and a centrifugal brake system, comprising:

a support member provided on one side of the spool, the support member being rotated in conjunction with the spool;

a plurality of brake shoes radially coupled to the support member by respective shaft pins, each of the brake shoes having a heavy weight part and a light weight part on opposite sides based on the corresponding shaft pin to have a weight eccentric structure, wherein when the spool is rotated, the brake shoes are swung by centrifugal force;

a brake disc coupled to the frame;

a controller adjusting a distance between the brake disc and the brake shoes, thus controlling braking power; and a connection member coupled to the support member, the connection member comprising a plurality of protruding stoppers limiting swing displacement angles of the respective brake shoes, wherein a friction position area between the brake disc and each of the brake shoes under control of the controller is formed on the same horizontal line as an outer side surface of the support member based on a circumferential direction of the support member, and wherein the brake disc comprises:

an auxiliary disc having a depression in a central portion thereof so that a portion of the support member is coupled to the auxiliary disc through the depression in an embedded form, with a protrusion protruding from a peripheral outer surface of the depression towards the spool; and a brake pad coupled to the protrusion of the auxiliary disc, the brake pad making contact with friction parts of the brake shoes, thus providing braking force.

2. The fishing reel as set forth in claim 1, wherein the connection member has a plurality of slots in which the respective brake shoes are swung, and each of the protruding stoppers is provided on opposite sides of the corresponding slot and protrudes in a direction opposite to a direction in which the corresponding brake shoe is swung.

3. The fishing reel as set forth in claim 2, wherein the protruding stoppers have different heights so that limit points of the swing displacement angles of the brake shoes differ from each other.

4. The fishing reel as set forth in claim 1, wherein a friction start position between the brake disc and each of the brake shoes under control of the controller is spaced apart from a center of each of the shaft pins towards the spool by a predetermined distance based on a circumferential direction of the support member.

5. The fishing reel as set forth in claim 1, wherein each of the brake shoes is configured such that, when the brake shoe has been completely swung, the friction part is disposed at a position spaced apart from the shaft pin of the brake shoe towards the spool.

6. The fishing reel as set forth in claim 5, wherein a side cover is mounted to the frame, and the controller comprises a dial coupled to the side cover.

* * * * *